(12) United States Patent
Fiala et al.

(10) Patent No.: US 9,223,148 B2
(45) Date of Patent: Dec. 29, 2015

(54) MULTIFOCAL LENS

(71) Applicant: Carl Zeiss Meditec AG, Jena (DE)

(72) Inventors: Werner Fiala, Vienna (AT); Mario Gerlach, Hohen Neuendorf (DE)

(73) Assignee: Carl Zeiss Meditec AG, Jena (DE)

(*) Notice: Subject to any disclaimer, the term of this patent is extended or adjusted under 35 U.S.C. 154(b) by 12 days.

(21) Appl. No.: 13/662,515

(22) Filed: Oct. 28, 2012

(65) Prior Publication Data

US 2013/0050640 A1 Feb. 28, 2013

Related U.S. Application Data

(63) Continuation of application No. PCT/EP2011/056552, filed on Apr. 26, 2011.

(30) Foreign Application Priority Data

Apr. 27, 2010 (DE) .................. 10 2010 018 436

(51) Int. Cl.
*G02C 7/04* (2006.01)
*G02C 7/06* (2006.01)

(52) U.S. Cl.
CPC ......... *G02C 7/041* (2013.01); *G02C 7/06* (2013.01); *G02C 2202/20* (2013.01)

(58) Field of Classification Search
CPC .......... G02C 7/041; G02C 7/044; G02C 7/06; G02C 2202/20; G02C 2202/22
USPC ..................... 351/159.12, 159.43
See application file for complete search history.

(56) References Cited

U.S. PATENT DOCUMENTS

| | | | |
|---|---|---|---|
| 5,344,447 A | 9/1994 | Swanson | |
| 5,760,871 A | 6/1998 | Kosoburd et al. | |
| 5,798,817 A * | 8/1998 | de Carle | 351/159.41 |
| 5,982,543 A * | 11/1999 | Fiala | 359/565 |
| 6,536,899 B1 | 3/2003 | Fiala | |
| 2008/0030677 A1 | 2/2008 | Simpson | |
| 2012/0200823 A1* | 8/2012 | Bandhauer et al. | 351/159.44 |

OTHER PUBLICATIONS

International Search Report dated Jun. 21, 2011 in international patent application PCT/EP2011/056552 on which the claim of priority is based.
English translation of Written Opinion of the international searching authority dated Jun. 21, 2011 in international patent application PCT/EP2011/056552 on which the claim of priority is based.

* cited by examiner

*Primary Examiner* — Jordan Schwartz
(74) *Attorney, Agent, or Firm* — Walter Ottesen P.A.

(57) ABSTRACT

A multifocal lens has a number n>2 of principal powers, of which at least one principal power is refractive and at least one principal power is diffractive. The multifocal lens includes a first lens portion having at least one first annular zone and at least a second lens portion having at least one second annular zone, wherein the zones each have at least one main sub-zone and at least one phase sub-zone. For forming the n principal powers, a maximum of n−1 lens portions are combined, and an averaged refractive power of a zone of the first lens portion is equal to an averaged refractive power of a zone of the second lens portion.

23 Claims, 11 Drawing Sheets

(state of the art)

(state of the art)

(state of the art)

(state of the art)

MULTIFOCAL LENS

CROSS REFERENCE TO RELATED APPLICATIONS

This application is a continuation application of international patent application PCT/EP2011/056552, filed Apr. 26, 2011, designating the United States and claiming priority from German application 10 2010 018 436.5, filed Apr. 27, 2010, and the entire content of both applications is incorporated herein by reference.

FIELD OF THE INVENTION

The invention relates to a multifocal lens with a number n>2 of principal powers, wherein at least one principal power is refractive and at least one further principal power is diffractive. The multifocal lens includes a first lens portion having at least one first annular zone and includes at least a second lens portion having at least one second annular zone. The zones are each formed at least with a main sub-zone and with at least a phase sub-zone.

BACKGROUND OF THE INVENTION

Multifocal lenses with refractive and diffractive powers are known from U.S. Pat. No. 6,536,899. These lenses have annular or circular-annular zones, wherein each of these annular zones is divided into one main sub-zone and one phase sub-zone. The system of the main sub-zones represents a diffractive lens having two principal powers. The refractive powers in the phase sub-zones are selected such that the averaged refractive power of the entire zone or of the entire lens corresponds to one of the two principal diffractive powers. In contrast to conventional diffractive lenses, the lens according U.S. Pat. No. 6,536,899 does not have any topographic or optical steps on the lens surface.

In U.S. Pat. No. 6,536,899, trifocal lenses are also described, in which the averaged refractive power is equal to the average of the three principal powers, in which the greatest principal power is given by the diffractive power of +1st order, and in which the smallest principal power is given by the diffractive power of −1st order.

Trifocal lenses of the described type have longitudinal chromatic aberrations both in the smallest and in the greatest of the three principal powers. If such lenses are to be employed as ophthalmic lenses (e.g. contact lenses, intraocular lenses), then, in particular the longitudinal chromatic aberration in the smallest of the principal powers is disadvantageous. Namely, this power is then used for imaging far objects, and a longitudinal chromatic aberration associated with the −1st diffraction order is particularly disturbing in such a use. Multifocal lenses with more than two principal powers are specifically desired in the area of ophthalmology since they allow sharp vision in the far distance, in the intermediate distance and in the reading distance. Besides the trifocal lenses according to U.S. Pat. No. 6,536,899, other trifocal lenses are known. In U.S. Pat. No. 5,344,447 trifocal diffractive lenses are described, further also in U.S. Pat. No. 5,760,871. A further trifocal lens is described in United States patent application publication 2008/0030677 A1.

The trifocal lens according to U.S. Pat. No. 5,344,447 has a minimum principal diffractive power equal to the −1st diffractive power with longitudinal chromatic aberration. Furthermore, this lens has the topographic or optical steps on at least one of the lens surfaces, usual in diffractive lenses.

The trifocal lens according to U.S. Pat. No. 5,760,871 also has a minimum principal diffractive power, which corresponds to the −1st diffraction order with longitudinal chromatic aberration.

The trifocal lens according to United States patent application publication 2008/0030677 A1 has a minimum principal diffractive power, which corresponds to the zeroth diffraction order, and a maximum power, which corresponds to the first diffraction order of the diffractive lens. According to this prior art, light is directed to a location between the two foci of these powers by a certain design of adjacent diffraction steps. As all of the conventional diffractive lenses, this lens has topographic steps or optical steps on one of the two lens surfaces.

Topographic steps on a lens surface are disadvantageous for several reasons: usually, such steps are difficult or not to be produced with the required precision. Furthermore, such steps are detrimental to the wearing comfort in ophthalmic lenses such as contact lenses.

A diffraction lens or diffractive lens generally consists of a number of circular-annular lens zones of each identical area; usually, such zones are called Fresnel zones. Between adjacent zones, usually, steps with the path length differences t associated therewith are provided, wherein these path length differences are usually smaller than a design wavelength $\lambda$. The area or size of the zones determines the separations between the diffractive powers of the lens, wherein these separations increase with decreasing area of the zones. The optical path length difference t determines the relative maximum intensities in the individual diffractive powers, for example, at $t=\lambda/2$, there are two principal diffractive powers, which correspond to the zeroth and the first diffraction order, and both have a maximum intensity of $(2/\pi)^2 = 40.5\%$, wherein 100% is the maximum intensity of a lens limited in diffraction with identical Fresnel zones, but no steps between the zones. The latter lens is a "normal" refractive lens. For path length differences, which are absolutely smaller than a half design wavelength, the power of the zeroth order dominates, in the case of $abs(t) > \lambda/2$, the power of the first diffraction order has the greatest relative intensity.

It is extremely important to note that a refractive power is associated with each individual Fresnel zone of a diffractive lens; this refractive power can be calculated by refraction of an incident light beam with application of the Snell's refraction law. The individual Fresnel zone can have a uniform power, but it also can have a surface configuration to the effect that the refractive power varies along the zone surface; then, the refractive power of such a zone is an average power.

In conventional multifocal diffractive lenses with optical steps between contiguous zones, none of the diffractive powers is identical to the refractive powers of the zones. In particular, this also applies to the zeroth diffractive power of a diffractive lens.

There are two fundamental formations of diffractive lenses. In the first formation, the path length difference t between the first and the second zone is equal to that between the second and the third zone, and so on. Embodiments of such diffractive lenses usually have a saw tooth profile on one of the two surfaces of a lens manufactured with a given refractive index. In the second fundamental formation of diffractive lenses according to the prior art, the optical path length differences are +t between the first and the second zone, −t between the second and the third zone, +t between the third and the fourth zone, and so on. The disadvantages of such known diffractive lenses are explained in U.S. Pat. No. 6,536,899.

In U.S. Pat. No. 6,536,899, lenses are mentioned according to the invention there, which are formed without topographic and optical steps on the lens surface. In this context, a trifocal lens is also mentioned, in which the individual zones have different averaged powers, and moreover disadvantageously longitudinal chromatic aberrations occur both in the smallest and in the greatest of the three principal powers.

SUMMARY OF THE INVENTION

It is the object of the present invention to provide an at least trifocal lens, which allows improved vision both in the near range and in the intermediate range and in particular in the far range.

The multifocal lens of the invention having a number n>2 of principal powers includes: a first lens portion having at least one first annular zone and a second lens portion having at least one second annular zone; the annular zones having respective main sub-zones and respective phase sub-zones; a maximum of n−1 lens portions differing in at least one optical parameter being combined to form the n principal powers; and, an averaged refractive power of the first annular zone of the first lens portion being equal to an averaged refractive power of the second annular zone of the second lens portion.

A multifocal lens according to the invention has at least a number n>2 of principal powers. Therefore, the multifocal lens is at least a trifocal lens. Especially at least one of the principal powers is refractive and at least a further principal power is diffractive. The multifocal lens has a first lens portion including at least one first annular zone. The multifocal lens moreover includes at least a second lens portion having at least one second annular zone. The zones of the lens portions each have at least a main sub-zone and at least a phase sub-zone. Both the main sub-zone and the phase sub-zone are also annularly formed. For forming the n principal powers, in the multifocal lens according to the invention, a maximum of n−1 lens portions are combined. An averaged refractive power of a zone of a lens portion is equal to an averaged refractive power of a zone of another lens portion. That is to say that all of the lens portions forming a multifocal lens have the same averaged refractive power. If a lens is for example constructed of two lens portions, then, these two lens portions have the same averaged refractive power. If the lens is for example constructed of three lens portions, then, the three lens portions have the same averaged refractive power. By such a specific configuration of the multifocal lens, the imaging and thus also the vision with the lens in the near range, in the intermediate range and in particular in the far range can be improved.

The lens portions are different in at least one optical parameter. For example, a power such as a far power or a near power or an addition power is to be mentioned as optical parameters. Furthermore, an optical parameter can for example also be a far intensity or a size of an optical surface.

In this context, by a lens portion, in particular a circular or circular-annular (annular) area of the lens is to be understood. A lens portion can also be composed of several noncontiguous circular or circular-annular areas or zones of the lens.

By a principal power, in particular a power is understood, the relative intensity of which is greater than 0.05 (5%), in particular greater than or equal to 0.07 (7%).

In particularly advantageous manner, a configuration is achieved, in which the multifocal lens does not have any diffractive longitudinal chromatic aberration in the smallest of the n principal powers. This ensures a greatly improved imaging characteristic and thus a considerably better vision in particular in the far range.

A refractive chromatic aberration due to dispersion of the optical material, which is small with respect to the diffractive chromatic aberration—and opposite in the +1st diffraction order—is not an issue in the present invention.

Especially this is particularly advantageous with regard to the color representation and the perception of images. Preferably, it is provided that the averaged refractive power of a zone is equal to the smallest of the principal powers of the multifocal lens. By this specification of the lens, the suppression of the diffractive longitudinal chromatic aberration in the smallest of the principal powers is accomplished. Preferably, this is also formed for all of the zones of a lens portion, if it has at least two zones. In particular, the zones of a lens portion have the same averaged refractive power.

In particular, the smallest of the n principal powers is free of diffractive longitudinal chromatic aberration.

Preferably, the multifocal lens is formed in the shape and/or relative position of the zones to each other such that the smallest of the principal powers is free of longitudinal chromatic aberration independently of the number of the principal powers n>2. Thus, the lens is also formed with its lens portions and the respectively associated zones to the effect that not only in a trifocal lens, but also in a quadrafocal et cetera lens, the smallest of the principal powers is always free of diffractive longitudinal chromatic aberration.

Preferably, the smallest of the n principal powers of the multifocal lens is dependent on the refractive power of a main sub-zone of a first zone weighted by the area proportion of the main sub-zone to the total surface of this first zone and moreover also dependent on the refractive power of the phase sub-zone of this first zone weighted by the area proportion of the phase sub-zone to the total surface of this considered zone. This in particular applies to each of the zones of the multifocal lens, wherein in particular for the smallest of the principal powers $D1$ of the lens, thus, there applies the relation:

$$D_1 = D_{G1}(1-p_1) + D_{S1}p_1 = D_{G2}(1-p_2) + D_{S2}p_2$$

Therein, it applies:

$D_{G1}$ is the refractive power in the main sub-zone of the first zone (and 3rd, 5th . . . zone); $D_{S1}$ is the refractive power of the phase sub-zone of the first (and 3rd, 5th . . . ) zone. $p_1$ is the area proportion of the phase sub-zone to the total first (and 3rd, 5th . . . ) zone.

$D_{G2}$ is the refractive power in the main sub-zone of the second zone (and 4th, 6th . . . zone); $D_{G2}$ is the refractive power in the phase sub-zone of the second (and 4th, 6th . . . ) zone. $p_2$ is the area proportion of the phase sub-zone to the total second (and 4th, 6th . . . ) zone.

The above statement is shown for a lens with two lens portions, wherein the odd-numbered zones are associated with the first lens portion and the even-numbered zones are associated with the second lens portion. The above mentioned equation also applies to a multifocal lens with more than two lens portions; for a further lens portion j, thereby, it applies:

$$D_1 = D_{Gj}(1-p_j) + D_{Sj}p_j$$

Preferably, it is provided that the first lens portion has at least two zones, between which viewed in radial direction of the lens, the at least one zone of the second lens portion is disposed. Therefore, the configuration in this implementation is such that in alternating ring arrangement a first zone of the first lens portion is formed, then a zone of the second lens portion follows and viewed in radial direction, then again a further first zone of the first lens portion is formed.

If more than two lens portions are formed, then, this alternating arrangement applies to the effect that viewed in radial direction, consecutively one zone of one of the lens portions is respectively disposed, and then, if an annular zone is formed from each lens portion, again a first zone of the first lens portion follows, and so on.

It can also be provided that in the case of more than two lens portions each lens portion has only one zone, and thereby the multifocal lens is formed. It can also be provided that at least one lens portion has more than one zone.

Preferably, it is provided that a first zone of the first lens portion is formed adjoining a zone of the second lens portion and the optical surfaces of these two zones are of equal size. This is in particular true for all of the zones respectively adjacent in pairs of two different lens portions. With regard to the optical surfaces of the zones, both the front face and the rear face of the lens can be considered in this respect. Depending on how the multifocal lens is configured in this respect, both the front face can have a corresponding surface profile and the rear face can have a corresponding surface profile. If the front face is correspondingly configured, then, the rear face can be aspherically formed. This is inversely true if the rear face has a corresponding surface profile.

It can also be provided that the respective mating surface to the surface with the structured surface profile (profile with the annular zones) is formed toric or aspherical-toric. Thereby, a mono-toric intraocular lens for correcting corneal astigmatism can be formed.

Preferably, it is provided that an overall zone formed of adjacent zones of two lens portions has an overall main sub-zone or a main sub-zone with the averaged refractive power $D_{G12}$ and a phase sub-zone with the power $D_{S2}$. The power $D_{S2}$ is already above indicated, the power $D_{G12}$ is given by:

$$D_{G12} = D_{G1}\frac{1-p_1}{2-p_2} + D_{S1}\frac{p_1}{2-p_2} + D_{G2}\frac{1-p_2}{2-p_2}$$

In particular, these relations apply to a trifocal lens with two lens portions.

Preferably, an overall zone formed of the two adjacent zones of the two lens portions has a refractive power of the overall phase sub-zone or the phase sub-zone, which corresponds to the power of the phase sub-zone of a lens portion. In particular, this is that lens portion, which is radially further outside, and thus the radially further outside phase sub-zone has the power $D_{S2}$.

Preferably, it is provided that in an implementation of the multifocal lens, a relative far intensity of the at least one zone of the first lens portion is greater than 10%, in particular at least 30%, preferably at least 100% different from a relative far intensity of the at least one zone of the second lens portion. By such a specific difference in the far intensities, the imaging characteristic of the multifocal lens can be improved in particularly positive manner, in particular with regard to the inhibition of a longitudinal chromatic aberration in the smallest of the principal powers of the lens.

Preferably, it is provided that in an implementation of the multifocal lens with more than two lens portions, relative far intensities each different in pairs are formed between zones of different lens portions. Thus, it is in particular provided that relative intensities of the respectively smallest powers of the lens portions have such a percentage difference of greater than 10%. Thus, even in specific multifocal lenses with more than three principal powers, such a specification of the far intensities also exists.

In particularly advantageous manner, the lens is a trifocal lens, which is constructed of two bifocal lens portions. Such a specified lens particularly advantageously allows improvement of the vision and especially does not have any longitudinal chromatic aberration in the smallest of the principal powers.

Preferably, the lens portions are formed in shape and/or local arrangement relative to each other such that a far power of the multifocal lens is substantially equal to that far power of a lens, which is formed exclusively of zones of the first lens portion or exclusively of zones of the second lens portion.

In particular, the lens portions are preferably formed in shape and/or local arrangement relative to each other such that a near power of the multifocal lens is substantially equal to that near power of a lens, which is formed exclusively of zones of the first lens portion or exclusively of zones of the second lens portion.

Preferably, a percentage area proportion of the at least one phase sub-zone to the total area proportion of the optical surface of a zone is less than 25%, preferably between 8% and 17%.

In particular it can be provided that an addition power of a bifocal lens portion is equal to the addition power of a second lens portion. However, the addition powers of various lens portions can also be different.

In an advantageous implementation, it can be provided that the smaller powers of the lens portions and the addition powers of the lens portions are each the same, and in particular the far intensities and/or the near intensities of the powers of the lens portions are different.

In a further implementation, it can also be provided that the greater powers of the lens portions and the addition powers of the lens portions are each different and in particular the far intensities and/or the near intensities of the powers of the lens portions are different. In particular, the smaller powers of the lens portions are then the same.

In a configuration of the multifocal lens as a trifocal lens formed of two bifocal lens portions, it can be provided that the smaller power of the first bifocal lens portion is different from the smaller power of the second bifocal lens portion.

In particular, it can also be provided that the greater power of the first bifocal lens portion is different from the greater power of the second bifocal lens portion.

Preferably, it is provided that a lens portion has at least two zones, which have an identical number of main sub-zones and an identical number of phase sub-zones. In particular, each zone has only one main sub-zone and only one phase sub-zone, wherein the phase sub-zone preferably is disposed radially further outside than the main sub-zone and terminates with the radially outer zone edge. In particular, it is also provided that both lens portions each have plural zones, which are formed identically with regard to the number of the main sub-zones and phase sub-zones and/or with regard to the local arrangement of the phase sub-zone in a zone.

It can also be provided that the zones of a lens portion and/or the zones of another lens portion are formed differently with regard to their number of main sub-zones and/or with regard to their number of phase sub-zones. Similarly, the local positions of the phase sub-zones in one zone can also be different.

In a preferred embodiment, a zone of a lens portion is formed adjoining a zone of another lens portion and the optical surfaces of the zones are of equal size. In particular, the optical surfaces of all of the zones of a lens portion are of equal size. The corresponding applies in particular also to the optical surfaces of all of the zones of another lens portion.

Preferably, a relative far intensity of the at least one zone of the first lens portion is greater than 10%, in particular at least 30%, in particular at least 100% different from a relative far intensity of the at least one zone of the second lens portion.

Preferably, the lens portions have identical addition powers.

Preferably, a lens with n>2 principal powers is constructed of n−1 bifocal lens portions. Thus, it can be a trifocal lens constructed of two bifocal lens portions. A quadrafocal lens can also be provided, which is formed of three bifocal lens portions. In particular for this lens, the implementations with identical addition powers and/or greater than 10% different far intensities and/or equally sized optical surfaces of the zones of the lens portions are advantageous.

Preferably, in a lens with n>2 principal powers, which is constructed of n−1 bifocal lens portions, such a configuration is provided that a continuous focus range and thus also power range is formed with overlapping formation of the focus depth ranges of the respective foci. This has the advantage that failure of the image for certain power ranges between the powers and thus the inverse foci does not occur.

In an implementation different from that, it is provided that a lens with n>2 principal powers, in particular four principal powers, is constructed of less than n−1, in particular two bifocal lens portions.

Preferably, here, it is provided that the size of an optical surface of a zone of the first lens portion is different from the size of an optical surface of a zone of the second lens portion.

In particular, the optical surface of the second lens portion is greater than the optical surface of the first lens portion by at least 50%, in particular at least 90%. Thereby, quadrafocal lenses can also be formed from two bifocal lens portions.

In these implementations, it is in particular provided that the addition powers of the two lens portions are different. In these implementations, it is in particular provided that the two lens portions have identical relative far intensities, preferably 50%.

In particular, the optical surfaces of the lens are free of topographic and optical steps. This means that the surface contour is continuous. In particular, this also means that the wave front behind the lens according to the invention is continuous, i.e. optical path length differences or optical steps between partial portions of the wave front behind the lens will not occur.

In a preferred implementation of the lens, a surface of the lens structured with the zones is formed such that it has an astigmatic effect with regard to its imaging characteristic. In particular, the powers of the zones are differently formed dependent on a meridian angle and thus the position of a meridian, in particular the principal axis. In a toric lens, the two meridians are principal axes, the axes of the ellipse. The difference of the two powers in the two meridians is referred to as cylinder. The surface of the lens structured with the zones is in particular applied to a toric or toric-aspherical base body. From this, also a bi-toric configuration variant results, in which both sides (structured and unstructured) can be formed toric or aspherical-toric. The advantage of the bi-toric is in that the toric optical effect on the two surfaces, front surface and rear surface of the lens, can be divided. This results in lower radius differences in the principal meridians respectively for both surfaces compared to a mono-toric intraocular lens with the same cylinder effect. The imaging quality of bi-toric intraocular lenses is better compared to mono-toric intraocular lenses. Thereby, a bi-toric intraocular lens can be constructed for correcting corneal astigmatisms.

Preferably, in at least one, in particular in each meridian, an averaged refractive power of a zone of the first lens portion is equal to an averaged refractive power of a zone of the second lens portion. This is in particular also possible in different meridians.

In an advantageous implementation, it is provided that the entire lens with n>2 principal powers is composed of a maximum of n−1 lens portions with each lens portion having at least one zone and thus further lens portions are not present any more. Thus, in this context, it can be provided that a trifocal lens is composed of two bifocal lens portions. Similarly, it can be provided that a quadrafocal lens is composed of three lens portions, in particular three bifocal lens portions, and further lens portions are not provided anymore. Similarly, it can be provided that a quadrafocal lens is composed of merely two different lens portions, in particular two different bifocal lens portions, and further lens portions are not present anymore. The above mentioned specific implementations and substantiations all also apply to such overall lenses, which are composed of n−1 lens portions, in particular n−1 bifocal lens portions.

In further implementations, however, it can also be provided, that an overall lens with n>2 principal powers is designed of a maximum of n−1 lens portions with each at least one zone, which in turn is each formed of at least one main sub-zone and at least one phase sub-zone, and moreover has at least one further lens portion.

In this context, a lens can be formed, which is in particular designed as a quadrafocal lens. According to a first implementation, it can be provided that this quadrafocal lens is only composed of two lens portions, which differ in at least one value of an optical parameter. The two lens portions each have at least one zone, which in turn respectively has at least one main sub-zone and one phase sub-zone. An averaged refractive power of a zone of the first lens portion is equal to an averaged refractive power of a zone of the second lens portion. Preferably, it is provided that the addition power of the first lens portion is 3.75 diopters, and the addition power of the second lens portion is 3.1 diopters. Preferably, the diameter of this lens is 4.245 mm. In particular, it is provided that the relative far intensity in the zones of the first lens portion is 90%, and preferably the relative far intensity in the zones of the second lens portion is 40%. Preferably, the area proportion of the main sub-zone in a zone is 90%. Preferably, this percentage area proportion of the main sub-zone is the same in all of the zones.

The optical areas of the zones of the first lens portion and thus the zones numbered in odd number sequence are different in size from the optical areas of the zones of the second lens portion and thus the zones numbered with even numbers.

In a further preferred embodiment all odd numbered annular zones have the same surface area. Further all even numbered annular zones have the same surface area, which is different to the surface area of the odd numbered annular zones. Therefore the radial thicknesses of the zones are different and decrease with the radius of the lens.

In a further implementation it can be provided that this quadrafocal lens is not composed of two lens portions differing in a value of an optical parameter, but that in addition to these two lens portions, a third lens portion is present. The quadrafocal lens is then constructed composed of three lens portions, which are in particular three bifocal lens portions. In particular, therein, it is provided that the zones of the two first lens portions are disposed alternating with each other viewed in radial direction, wherein this is in particular effected up to a diameter of 4.245 mm. Then, adjoining radially outwards, the third lens portion is adjoining annularly formed. This third lens portion, which is also bifocal, then preferably extends to a total diameter of about 6 mm, in particular 5.888 mm. This third bifocal lens portion is also formed composed of at least one, in particular plural zones, wherein each zone in turn has a main sub-zone and a phase sub-zone. Preferably, the addition power of the third lens portion is 3.33 diopters. This corresponds to the average of the two diopter values 3.75 and 3.1 of the two first lens portions.

Preferably, the relative far intensity in the zones of the third lens portion is 65%.

Such an implementation of a quadrafocal lens with an additional radially outside third lens portion with the mentioned specific values would be advantageous especially if a large pupil of the eye is present, into which the intraocular lens is to be inserted. Since with large pupils the far and the near intensity and less the intermediate intensity are important and come to the fore, such a configuration with a third lens portion is advantageous.

In a further implementation of a lens, which can be referred to as a quadrafocal lens, in contrast to the above mentioned implementation, in which this lens is composed of two lens portions, it is provided that the relative far intensities are not 90% and 40%, but preferably 85% and 39.5%. Preferably, such a lens corresponds to the ratios of 50:20:30 with regard to the relative intensities for the far range, the intermediate range and the near range.

Here too, a further implementation can be additionally provided, in which as the additional third lens portion such one is provided as it was explained in the previously mentioned implementation, wherein here in particular an addition power of 3.33 diopters and a relative far intensity of 65% are again also provided.

Here too, it can be provided that the addition power of the zones of the third lens portion is 3.33 diopters.

In a further implementation, it can be provided that a quadrafocal lens according to the above explanations is composed of merely two lens portions, which differ in a value of at least one optical parameter. Unlike the above mentioned specific explanations, here, it can be provided that the addition power is again 3.75 diopters in the first lens portion and 3.1 diopters in the second lens portion, however, the relative far intensities are 82% in the first lens portion and 41.75% in the second lens portion.

Here too, a further embodiment can be formed to the effect that the quadrafocal lens is not composed of these two lens portions, but of three lens portions. Thereto, here too, it is again provided that in addition to the two lens portions with the zones disposed alternating from inside to outside viewed in radial direction, the third lens portion is formed adjoining these two lens portions outwards in radial direction. It is preferably formed with several zones, which are identically formed with regard to the parameter values. In particular, here, it is provided that the relative far intensity is again 65%. Here too, the addition power can be 3.33 diopters.

In a further embodiment, in contrast to the above mentioned quadrafocal lenses, a quadrafocal lens can again be provided, which is constructed of two lens portions. They differ in particular in the relative far intensity from the embodiments mentioned up to now, wherein the relative far intensity of the first lens portion is 86.5% and that of the second lens portion is 40%. Otherwise, the values for the addition powers are analogous to the previously mentioned embodiments.

Here too, a further embodiment can be additionally provided, in which a third lens portion is disposed radially adjoining outwards to the two first lens portions as a bifocal lens portion for the quadrafocal lens. This third lens portion also preferably includes plural zones, however, which are identical with regard to the parameter values of the optical parameters. Here too, it can be in particular provided that the relative far intensity of the zones of the third lens portion is 65%, in particular the addition power is also 3.33 diopters.

It can also be provided that in all of the previously mentioned embodiments with quadrafocal lenses constructed of three bifocal lens portions, the addition power of the third lens portion is not 3.33 diopters, but 3.75 diopters. Especially if the averaged addition power of the first two lens portions is 3.33 diopters and the addition power value of the third lens portion is 3.75 diopters. As a consequence thereof, the intensities of the peaks of the near power are smaller for large pupils, but the intensity distribution in the near field becomes wider. However, the total energy of this near power is not influenced thereby.

Preferably, in the just mentioned implementations for quadrafocal lenses, it is provided that the first lens portion has seven zones and the second lens portion also has seven zones. Preferably, in the implementations of a quadrafocal lens with three bifocal lens portions, it is provided that the number of the zones of the third lens portion is greater than 5, in particular greater than 10. In particular, this depends on the diameter of the pupil.

In particular, the multifocal lens is an eye lens, in particular a contact lens or more preferred an intraocular lens.

Both the specific values of parameters specified in the documents and the specification of parameters and the ratio of parameters to each other for the characterization of specific characteristics of the lens are to be considered as included by the scope of the invention even with-in the scope of deviations, for example due to measurement errors, system errors, DIN tolerances etc., such that in this context indications relating to an identity of powers, far intensities, positional indications, dimensionings and the like are to be considered as identical even within the scope of an indication "substantially".

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention.

BRIEF DESCRIPTION OF THE DRAWINGS

The invention will now be described with reference to the drawings wherein.

Figure 1:
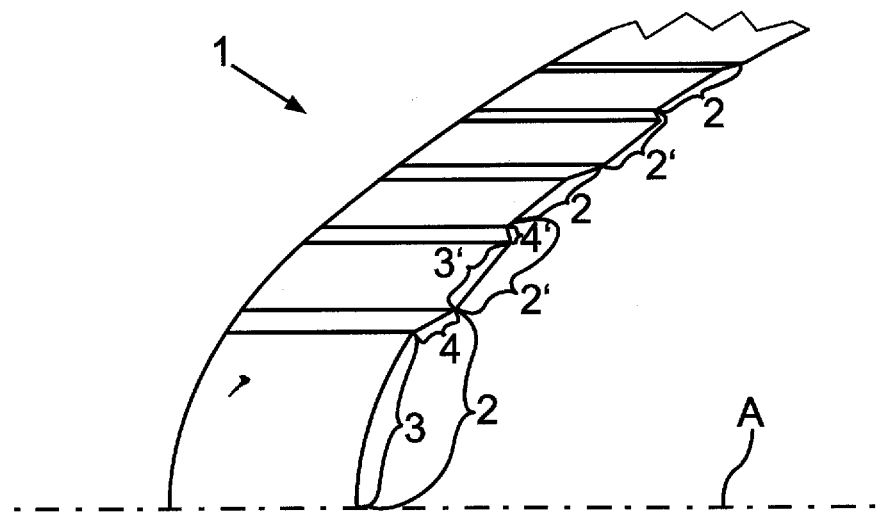
FIG. 1 a schematic representation of a partial section of a lens cross-section of a known trifocal lens according to U.S. Pat. No. 6,536,899, which is constructed of identical zones.

DESCRIPTION OF THE PREFERRED
EMBODIMENTS OF THE INVENTION

In the figures, similar or functionally similar elements are provided with the same reference characters.

Figure 2:
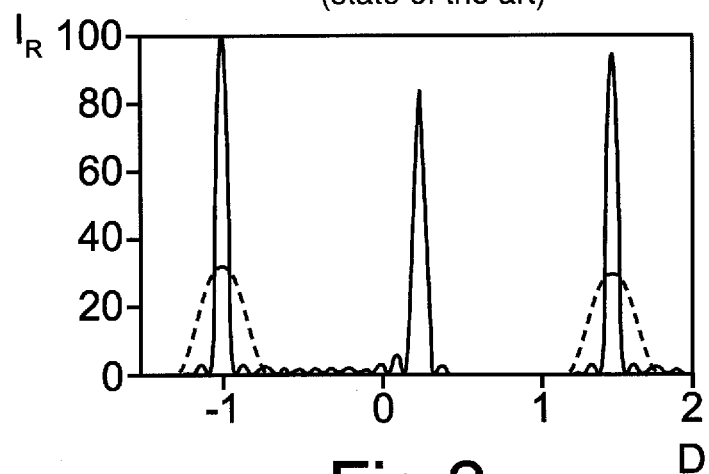
FIG. 2 is a representation of a diagram, in which the relative intensity of lens powers for a trifocal lens according to FIG. 1 is shown.

In FIG. 1, in a sectional representation, a part of a trifocal lens 1 with diffractive and refractive powers known from the prior art according to U.S. Pat. No. 6,536,899 is shown. The lens 1 has a longitudinal chromatic aberration both in the smallest and in the greatest of the three principal powers, as the dashed curve in FIG. 2 shows. In FIG. 2, on the vertical axis, the relative intensity is plotted and on the horizontal axis the lens power in diopters is plotted. The relatively large intensities $I_R$ of the three principal powers are apparent, wherein the solid line is represented for monochromatic light at a design wavelength of 550 nm, and the dashed line is taken as a basis for polychromatic light with a Gaussian distribution in the wavelength range between 450 nm and 650 nm. The intensity for 450 nm and 650 nm, respectively, is 20% of the maximum intensity for 550 nm.

As it is explained in detail to these configurations in U.S. Pat. No. 6,536,899, the lens 1 according to FIG. 1 is composed of zones 2 and 2' equal in area, which are annularly formed and each have main sub-zones 3 and 3' and phase sub-zones 4 and 4'. The zones 2 and 2' viewed radially from the central axis A and thus upwards in the representation according to FIG. 1, are virtually numbered in their order and the odd zones 2 are formed such that for example the smaller one of the diffractive powers corresponds to the averaged refractive power of the zones 2. In contrast, then, the averaged refractive power of the even zones 2' corresponds to the greater diffractive power. Due to this configuration, the lens 1 according to FIG. 1 has a longitudinal chromatic aberration both in the greatest and in the smallest of the principal powers, as it is also apparent in FIG. 2. On the rear side of the lens 1, the profile or the contour is formed such that in a zone 2, the phase sub-zone 4 extends obliquely rearwards with respect to the contour of the main sub-zone 3. In the adjacent zone 2', this is exactly inverse, such that there the contour of the phase sub-zone 4' then again extends obliquely forwards with respect to the main sub-zone 3' of the further zone 2', such that virtually alternately elevations and depressions are formed.

Figure 3:
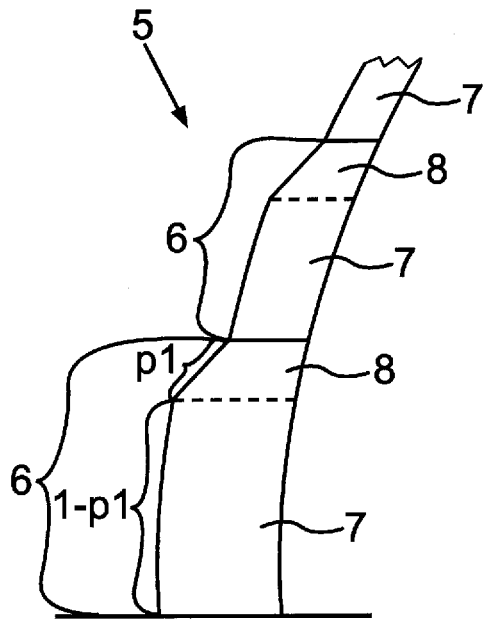
FIG. 3 is a schematic cross-sectional representation of a bifocal lens according to U.S. Pat. No. 6,536,899, wherein the identical zones of the lens are configured such that the relative intensity of the smaller one of the two powers has an intended value.

In FIG. 3, the topographic profile of a bifocal lens 5 according to U.S. Pat. No. 6,536,899 is schematically shown in a partial section. This lens 5 has a given relative intensity distribution between two principal powers of for example 40% for the smaller power (far power). The bifocal lens 5 has exemplarily a smaller power (far power) of 20 diopters and a greater power (near power) of 24 diopters. The addition power of the lens 5 is thus 4 diopters. The lens 5 is constructed of identical zones 6, which in turn are divided into main sub-zones 7 and phase sub-zones 8. The powers in the sub-zones 7 and 8 are selected such that the averaged power of the zone 6 weighted by the percentage area proportions p1 and 1−p1, respectively, is equal to the smaller one of the two principal powers of the lens 5.

Figure 4:
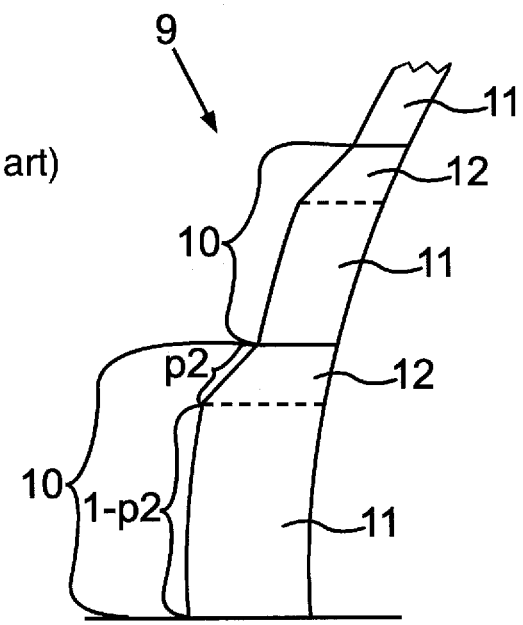
FIG. 4 is a schematic representation of a partial section of a cross-section of a further bifocal lens according to U.S. Pat. No. 6,536,899, wherein the identical zones of this lens are configured such that the relative intensity in the smaller one of the two powers has a further, different value compared to the representation according to FIG. 3.

In FIG. 4, the topographic profile of a further bifocal lens 9 according to U.S. Pat. No. 6,536,899 is schematically shown in a partial section. This lens 9 is composed of identical zones 10 with the corresponding main sub-zones 11 and phase sub-zones 12. The bifocal lens 9 according to FIG. 4 exemplarily has the same principal powers as the lens 5 according to FIG. 3, but a different intensity division between the smaller and the greater one of the two principal powers. This means that the refractive powers in the main sub-zones 7 of the lens 5 are different from the refractive powers in the main sub-zones 11 of the lens 9; the refractive powers in the phase sub-zones 8 and 12 are also each different.

Figure 5:
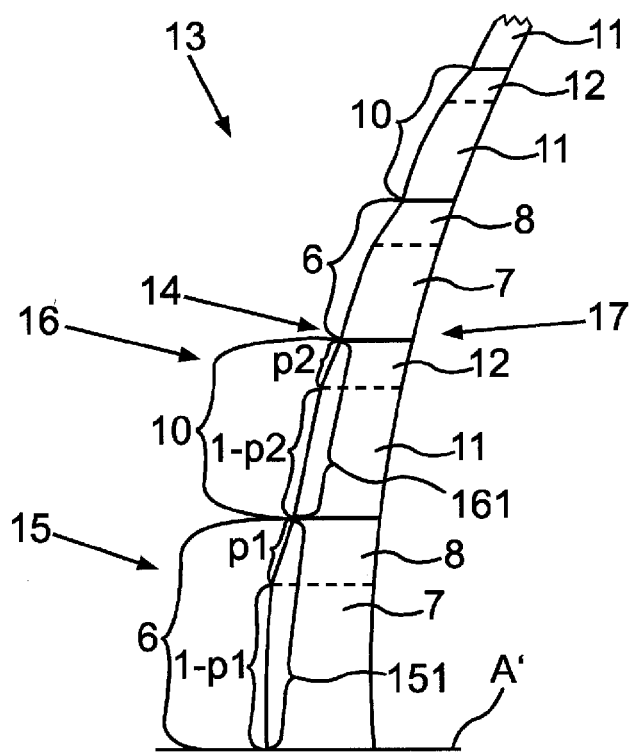
FIG. 5 is a schematic representation of a partial section of a lens in cross-section according to an embodiment of the multifocal lens according to the invention.

In FIG. 5, in a schematic representation, a longitudinal section through an embodiment of a multifocal lens 13 according to the invention is shown, wherein only a section of the lens 13 is shown. The lens 13 is a trifocal lens and thus has n=3 principal powers. The lens 13 has a first lens portion 15 and a second lens portion 16. The first lens portion 15 is constructed of plural annular zones 6. Each annular zone 6 has a main sub-zone 7 and a phase sub-zone 8. The percentage area proportion p1 and thus the size of the optical surface and thus of a respective total annular surface of a phase sub-zone 8 of a zone 6 is for example between 8% and 17% of a total area of a zone 6. In contrast to this, then, the area proportion and thus the size of the optical surface of a main sub-zone 7 is equal to 1−p1. With regard to the area proportions, this is considered with respect to a front face 14 of the lens 13. The entire optical surface 151, which is an annular area of a zone 6, is identified like the entire optical surface 161, which is also an annular area of a zone 10.

The lens 13 is constructed to the effect that the second lens portion 16 has plural identical annular zones 10, wherein here too each zone 10 has a main sub-zone 11 and a phase sub-zone 12. Here too, with respect to the front face 14 of the lens 13, an area proportion p2 for the phase sub-zone 12 and an area proportion 1−p2 for the main sub-zone 11 are formed. For example, here too, the area proportion p2 is between 8% and 17% of the total area of the zone 10. According to the representation, it can be appreciated that in radial direction of the lens 13 and thus perpendicularly upwards in the representation according to FIG. 5 with respect to the horizontal axis A', the zones 6 and 10 are disposed alternately and thus in alternating manner. Thus, the lens 13 is constructed as a combination of different zones 6 and 10 disposed in alternating manner adjacent to and adjoining each other. In the embodiment, it is provided that each zone 6 has respectively only one main sub-zone 7 and respectively only one phase sub-zone 8, wherein it is in particular also provided that the phase sub-zones 8 of the zones 6 are formed at the edge of the annular shape of a zone 6, in particular formed radially outside and adjoining to th the outer zone edge of a zone 6. An analogous configuration applies to the zones 10 of the second lens portion 16.

It can also be provided that the zones 6 of the first lens portion and/or the zones 10 of the second lens portion are differently formed with regard to their number of main sub-zones 7 and/or 11 and/or with regard to their number of phase sub-zones 8 and/or 12. Similarly, the local positions of the phase sub-zones 8 and 12, respectively, in a zone 6 and 10, respectively, can also be different.

The front face 14 of the lens 13 is formed without topographic and optical steps or discontinuities, which means that the contour of the front face 14 is continuous. Moreover, such a stepless formed lens 13 also implies that the wave front behind the lens 13 is continuous. The contour of the front face 14 is configured in the embodiment such that the direction of the contour of a phase sub-zone 8 of a zone 6 is directed towards the rear side 17 of the lens 13 and joins the contour of a main sub-zone 11 of the radially subsequent zone 10. The same applies to all of the zones 6 and all of the zones 10. This is exemplary. It can also be provided that the contour extensions of all of the phase sub-zones 8 are each directed forwards. It is essential that they all are oriented in one direction.

In the embodiment, a rear face 17 of the lens 13 is formed aspherically. It can also be provided that the rear face 17 is formed corresponding to the front face 14 and the front face 14 is formed corresponding to the aspherical configuration of the rear face 17 according to the representation in FIG. 5. Thus, in radial order, the lens 13 is in particular composed of odd zones, which correspond to the zones 6 of the first lens portion 15, and of even zones, which correspond to the zones 10 of the second lens portion 16. The optical surface 151 of a zone 6 is equally sized as an optical surface 161 of a zone 10. Furthermore, the optical surfaces 151 of all zones 6 are equally sized. The corresponding applies to the optical surfaces 161 of all zones 10.

Figure 9:
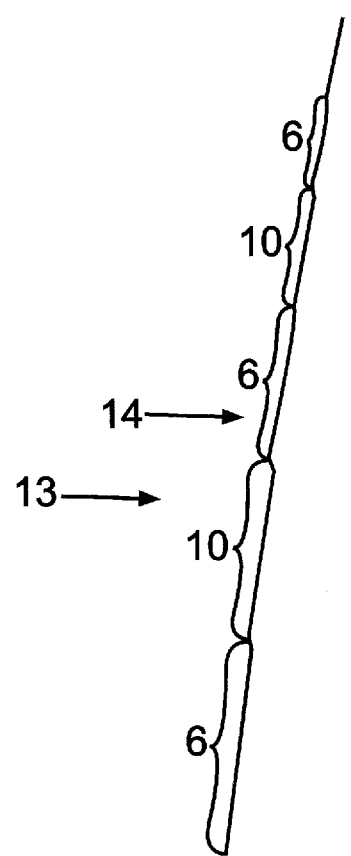
FIG. 9 is an enlarged representation of a section of a front face of an embodiment of a lens according to the invention, in which the stepless representation is represented substantially to scale with regard to the dimensions and geometry.

In FIG. 9, in an enlarged representation, the contour or the profile of a front face 14 of a further implementation of a lens according to the invention is shown to scale with regard to the other size ratios. The stepless configuration can be appreciated.

Figure 6:
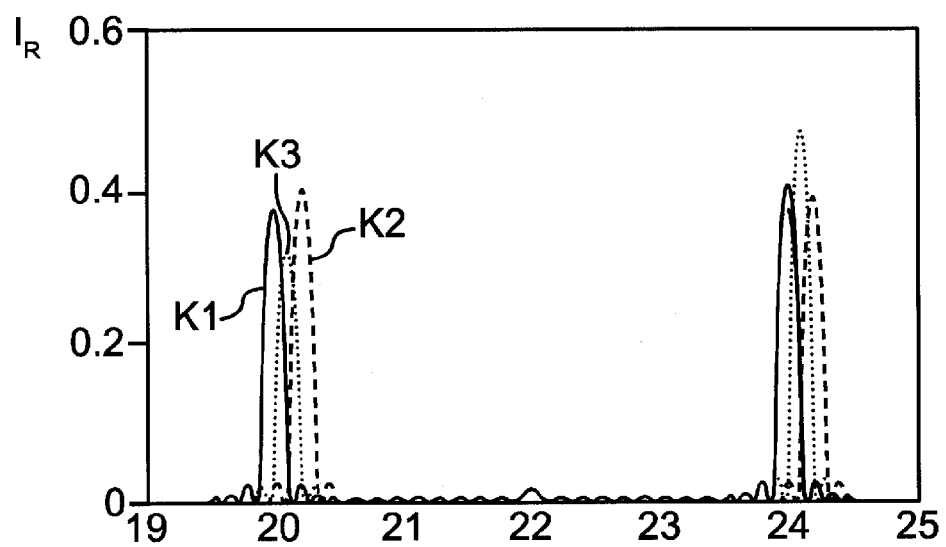
FIG. 6 is a diagram, in which the relative intensities of the powers of the lens according to FIG. 5 are shown.

In FIG. 6, a diagram is shown, in which the relative intensity $I_R$ is represented as a function of the power D of the lens 13. Thus, FIG. 6 shows the TFR or axial PSF of the lens according to FIG. 5; the results apply to a lens diameter of 6 mm. The odd zones 6 of the lens 13 according to FIG. 5 correspond to a bifocal lens portion 15 according to a lens analogous in FIG. 3 with a relative far intensity of 40%. The even zones 10 of the lens 13 according to FIG. 5 correspond to a bifocal lens portion 16 according to a lens analogous to FIG. 4 with a relative far intensity of 50%. As is apparent, the lens 13 according to FIG. 5 has a weak intensity focus in the center between the identical far focus (example: 20 diopters) and the identical near focus (example: 24 diopters) of the two lenses according to FIG. 3 and FIG. 4. The solid curve K1 identifies the relative intensity of the principal powers of the lens 13. The curve K2 shows the relative intensity of a lens having only zones 6 (lens portion 15) with a relative far intensity of 50%. The curve K3 shows the relative intensity of a lens having only zones 10 (lens portion 16) with a relative far intensity of 40%. For better perceptibility, the curves K2 and K3 of the two bifocal lens portions 15 and 16 are each displaced by 0.1 and 0.2 diopters, respectively.

In U.S. Pat. No. 6,536,899, it is described how the powers $D_G$ of the main sub-zones and the powers $D_S$ of the phase sub-zones are to be determined at a desired relative intensity of the smaller power (far power). As explained, these powers are also dependent on the area proportion p of the phase sub-zones and on the area proportion (1−p) of the main sub-zones to the overall annular zones of the lens, respectively.

Figure 7:
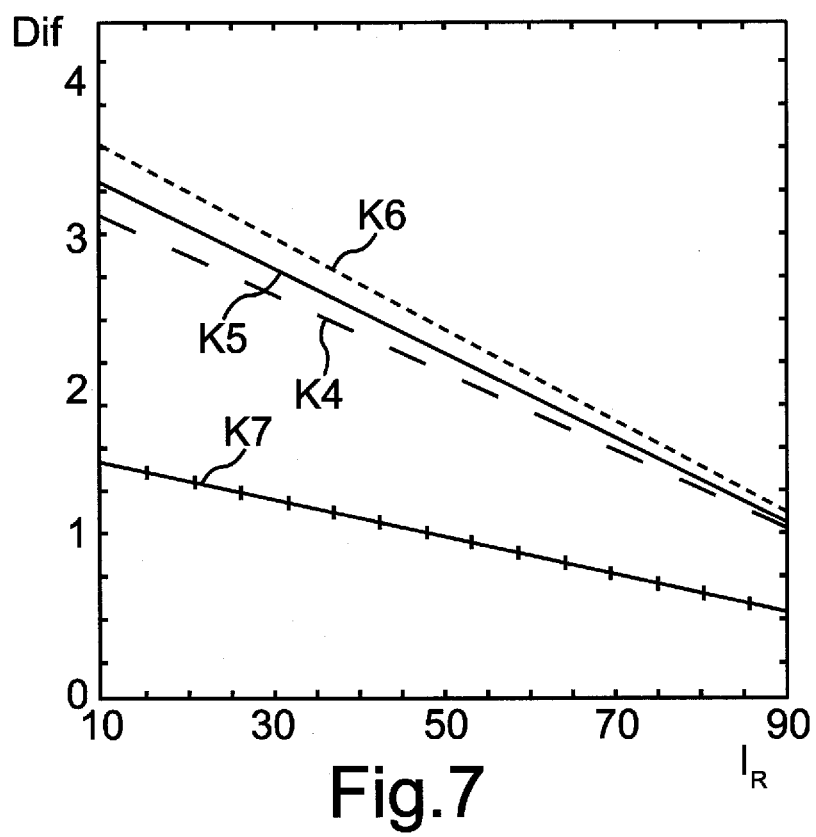
FIG. 7 is a diagram, in which the powers of the main sub-zones of lenses according to FIG. 3 and FIG. 4 are shown as a function of the relative intensity of the smaller power (far power) for some exemplary proportions of the main sub-zones to the overall zone and for an addition power of 4 diopters.

FIG. 7 displays the association between the difference Dif of refractive power $D_G$ of the main sub-zone and the desired far power depending on the relative intensity $I_R$ of the far power for exemplary area proportions of the main sub-zones in the overall zones and for the exemplary addition power of 4 diopters. This association can be determined according to the explanations of U.S. Pat. No. 6,536,899 for any area proportions of the main sub-zones to the overall annular zones. For example, the curve K4 is therein for an addition power of 4 diopters and an area proportion of the main sub-zone of 95%, the curve K5 is for an addition power of 4 diopters and an area proportion of the main sub-zone of 90%, and the curve K6 is for an addition power of 4 diopters and an area proportion of the main sub-zone of 85%. The curve K7 applies to an addition power of 2 diopters and an area proportion of the main sub-zone of 95%.

For the sake of simplicity and clarity, now, it is defined as follows:

It is clear that an individual zone 6 or zone 10 does not represent a lens 13, which has refractive and diffractive powers. Rather, a lens 13 with refractive and diffractive powers is composed of at least two zones 6 and 10. Nevertheless, for the sake of simplicity, now, it is referred to zones 6 or bifocal lens portion 15 or zones 10 or bifocal lens portion 16, which have a greater power and a smaller power.

Figure 8:
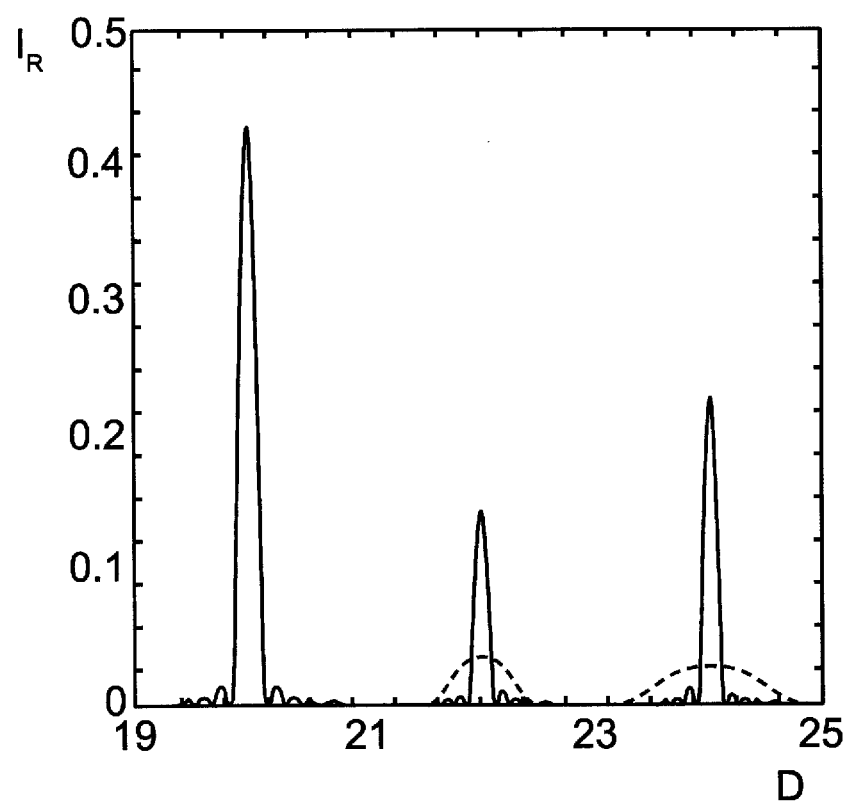
FIG. 8 is a diagram, in which the relative intensities of the principal powers of a lens according to FIG. 5 are represented.

FIG. 8 shows the TFR or axial PSF of a trifocal lens according to FIG. 5, wherein the odd zones 6 have a relative far intensity of 86% and the even zones 10 have a relative far intensity of 40%. As apparent, in this lens 13, the intensity of the intermediate focus is considerable. The solid curve shows the intensity distribution of the powers for monochromatic light of the wavelength 550 nm. FIG. 7 also shows the results for polychromatic light according to a Gaussian distribution in the wavelength range between 450 nm and 650 nm according to the dashed curve. From this, it can be appreciated that the smallest of the three principal powers does not have any longitudinal chromatic aberration. The results of FIG. 8 apply to a lens diameter of 6 mm.

In FIG. 9, as already mentioned above, a section of the front face 14 of an intraocular lens 13 of 20 diopters of far power is shown to scale. The main sub-zone portions of the zones 6

(odd zones) and 10 (even zones) are each 85%. The relative far intensity of the zones 6 is 86%, that of the zones 10 is 40%. The refractive index of the lens 13 is 1.46. As is apparent from FIG. 9, this lens 13 does not have any topographic steps, but only smooth, hardly perceivable transitions between the main sub-zones; these transitions are formed by the respective phase sub-zones. Unlike the conventional diffractive lenses, lenses of the present invention do not have any topographic steps. These topographic steps are required in diffractive lenses in order to produce optical path length differences between the wave fronts of the individual zones. The wave front behind a diffractive lens is therefore discontinuous, while the wave front behind a lens according to the present invention is continuous.

Figure 10:
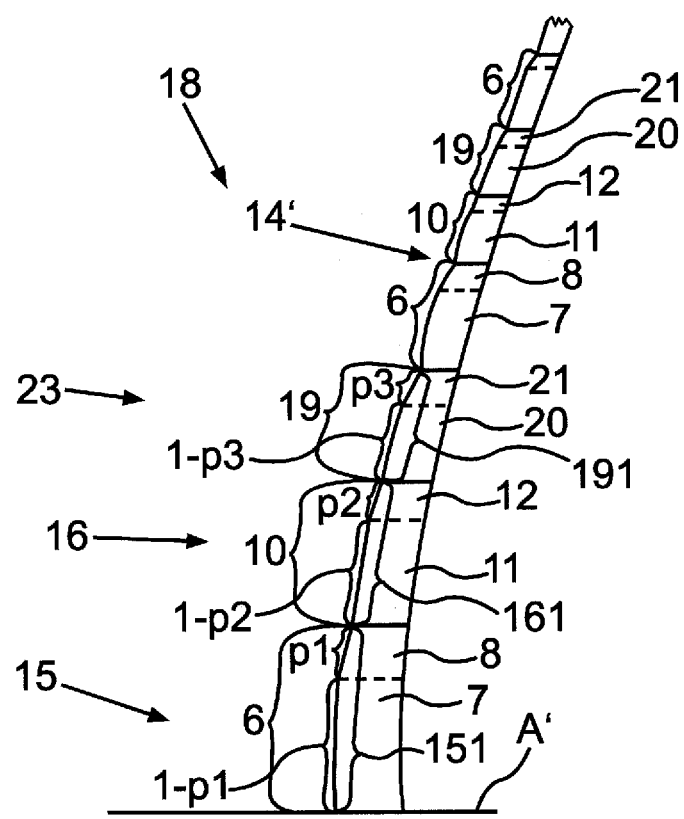
FIG. 10 is a schematic representation of a partial section of a further embodiment of a lens according to the invention, which is formed as a possible quadrafocal lens.

FIG. 10 schematically shows an implementation of a quadrafocal lens 18 constructed of three different lens portions, in particular bifocal lens portions 15, 16 and 23. The lens portions 15 and 16 each have plural zones 6 and 10, as they were already explained above. The third lens portion 23 also has plural zones 19, which in turn are each constructed of a main sub-zone 20 and a phase sub-zone 21. The lens portions 15, 16 and 23 have three different relative far intensities. The far intensities are formed in pairs with a difference of greater than 10%. In a lens 18 according to FIG. 10, the zones with the numbers 1,4,7 ... (1+3*m) in radial order are zones 6, further the zones with the numbers 2,5,8 ... (2+3*m) are zones 10, and finally the zones with the numbers 3,6,9 ... (3+3*m) are zones 19 with the sub-zones 20 and 21 (m=0,1,2 ... ). These three respectively bifocal lens portions 15, 16 and 23 each have the same far and near power in the embodiment. At least two of the three lens portions 15, 16 and 23 each have different relative far and near intensities, respectively. The percentage area proportion p3 and thus the size of the optical surface of the phase sub-zone 21 is in particular between 8% and 17%. Thus, the proportion 1−p3 of the main sub-zone 20 is between 83% and 92%. The optical surfaces 151, 161 and 191 of the zones 6, 10 and 19 are equally sized. The zones 19 all have equally sized optical surfaces 191, which are annular surfaces.

Figure 11:
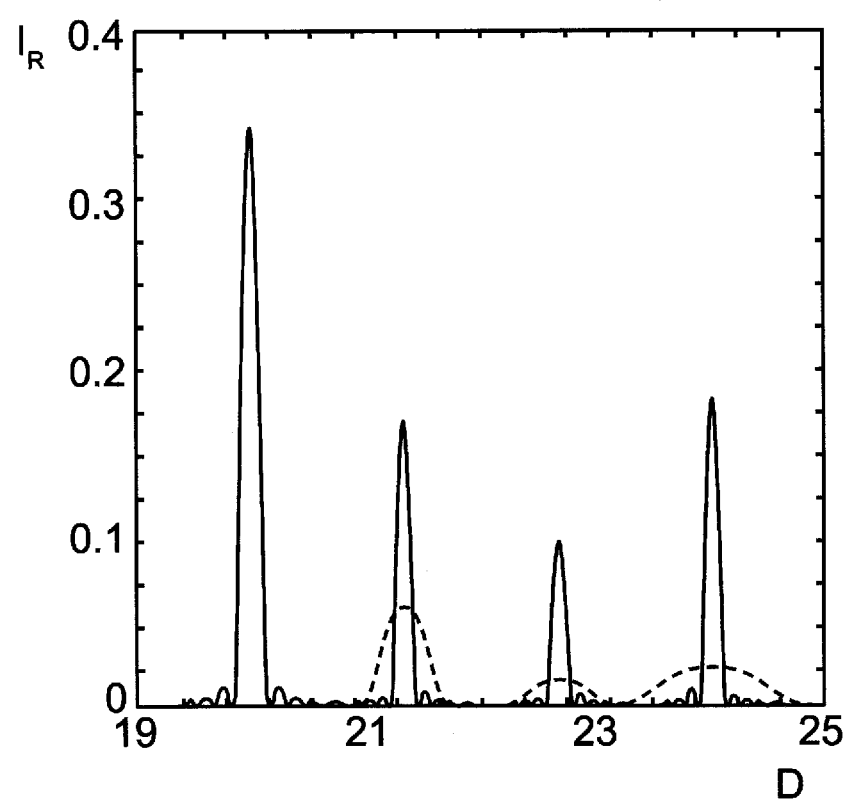
FIG. 11 is a diagram, in which the relative intensities of the principal powers of the lens according to FIG. 10 are represented.

The TFR or axial PSF of a lens according to FIG. 10 is shown in FIG. 11. In this example, the zones 6 with the numbers 1,4,7 ... have a relative far intensity of 86%, the zones 10 with the numbers 2,5,8 have a relative far intensity of 75%, and the zones 19 with the numbers 3,6,9 have 9%. The results of FIG. 11 apply to a lens diameter of 5.75 mm. The solid curve again indicates the intensity of the powers with monochromatic light of the wavelength 550 nm, wherein the dashed line shows the intensity of polychromatic light between 450 nm and 650 nm (Gaussian distributed).

Other relative far and near intensities of the zones 6, 10 and 19, respectively, result in other relative intensities in the four maximums of FIG. 11.

As already explained in U.S. Pat. No. 6,536,899, the difference ΔD between the greater power $D_2$ (near power) and the smaller power $D_1$ (far power), i.e. the addition power of a bifocal lens formed of annular zones with each at least one main sub-zone and at least one phase sub-zone, is:

$$\Delta D = \frac{8\lambda N}{B^2} \quad (1)$$

In equation 1, λ is the design wavelength (e.g. 550 nm), N is the number of the annular zones equal in area or overall zones, and B is the diameter of the lens, on which the annular zones are located. With N zones equal in area of the area of each $F_Z$ on a diameter B, the addition power ΔD is thus given by:

$$\Delta D = \frac{2\lambda\pi}{F_Z} \quad (2)$$

Thus, the addition power is inversely proportional to the surface area $F_Z$ of the overall zones. The overall zones have a power profile, which is given by the refractive power $D_G$ in the main sub-zones and the refractive power $D_S$ in the phase sub-zones, as shown in U.S. Pat. No. 6,536,899. Since this power profile repeats in each zone of the area $F_Z$, the power profile is called periodical in $F_Z$.

If zones of a lens according to U.S. Pat. No. 6,536,899 with a relative far intensity $I_1$ and a given addition power are now alternately combined with zones of a lens according to U.S. Pat. No. 6,536,899 with a relative far intensity $I_2$ and the same addition power, then, both zones according to U.S. Pat. No. 6,536,899 have an averaged refractive power of $D_1$ (far power). Due to the different relative far intensities, however, the two zones each have different powers in the main sub-zones and the phase sub-zones. In FIG. 7, the dependency of the powers in the main sub-zones on the relative far intensity is exemplarily shown for bifocal lenses with 4 diopters of addition power. The powers in the phase sub-zones can be calculated from the far power of the lens (corresponding to the averaged power of the overall zones) and the powers in the main sub-zones:

As is shown in U.S. Pat. No. 6,536,899, the following relations apply to the averaged far power $D_{av}$ and the refractive powers $D_G$ and $D_S$:

$$D_{av} = D_G(1-p) + D_S p \quad (3)$$

wherein p is the percentage area proportion of the phase sub-zone to the overall zone, and $D_G$ is the refractive power of the main sub-zone, $D_S$ is the refractive power of the phase sub-zone. As an example, it is to be demanded that the relative intensity of the far power is 70%, and the far power is to be 20 diopters; further, the proportion p of the phase sub-zone is to be 0.15 or 15%, the proportion of the main sub-zone then is 85%. Based on FIG. 7, one obtains the value of 1.8 diopters for the difference between the main sub-zone power and the far power. Thereby, one obtains the value $D_G$=21.8 diopters, and with the aid of the above formula 3 the value $D_S$=9.8 diopters. In analogous manner, for a relative far intensity of 60% instead of 70%, one obtains the values $D_G$=22.2 diopters and $D_S$=7.53 diopters.

The respective differences in the main sub-zones and in the phase sub-zones are small as is apparent from FIG. 7 or these examples, if the differences of the relative far intensities $I_1$ and $I_2$ are not large. In these cases, the overall zones with relative far intensity $I_1$ slightly differ from the overall zones with relative far intensity $I_2$. Therefore, the periodicity of the power profile substantially is maintained, i.e. the difference between the powers is further determined by the area $F_Z$ of the individual zones—with slightly different powers in the sub-zones. FIG. 6, which applies to a lens, in which zones with $I_1$=40% are combined with zones with $I_2$=50%, thus substantially shows a TFR or axial PSF of a bifocal lens with an addition power corresponding to the area $F_Z$. The slight differences in the sub-zones of the two consecutive zones 6 and 10 effect only slight variations in the characteristics of this lens.

However, if the relative far intensities $I_1$ and $I_2$ in consecutive zones substantially differ, then, the disturbance of the periodicity in $F_Z$ is considerable. Rather, a periodicity of the power profile given by the surface area of two adjacent zones, thus by $2*F_Z$, results. Thus, lenses 13 or 18 composed of overall zones, for which the relative far intensities $I_1$ and $I_2$ are each substantially different, have an addition power, which is given by $$\Delta D_N = \frac{2\lambda\pi}{2F_Z} \quad (4)$$

The individual powers for an exemplary lens 13 with two lens portions 15 and 16 are now specified as follows:

$D_1$ is the smallest of the principal powers (far power) of the lens 13.

$D_{G1}$ is the refractive power in the main sub-zone 7 of the first zone 6 (and 3rd, 5th ... zone) and $D_{S1}$ is the refractive power in the phase sub-zone 8 of the first (and 3rd, 5th ...) zone 6.

$p_1$ is the area proportion of the phase sub-zone 8 to the overall first (and 3rd, 5th ...) zone 6.

$D_{G2}$ is the refractive power in the main sub-zone 11 of the second zone 10 (and 4th, 6th ... zone) and $D_{S2}$ is the refractive power in the phase sub-zone 12 of the second (and 4th, 6th ...) zone 10.

$p_2$ is the area proportion of the phase sub-zone 11 to the overall second (and 4th, 6th ...) zone 10.

Then it applies:

$$D_1 = D_{G1}(1-p_1) + D_{S1}p_1 = D_{S1}p_1 = D_{G2}(1-p_2) + D_{S2}p_2 \quad (5)$$

The averaged refractive power $D_{G12}$ of the two first main sub-zones $D_{G1}$ and $D_{G2}$ and of the phase sub-zone $D_{S1}$ of an overall zone 22 (FIGS. 13 and 14) composed of a zone 6 of the first lens portion 15 and an adjoining zone 10 of the second lens portion 16 is given by $$D_{G12} = D_{G1}\frac{1-p_1}{2-p_2} + D_{S1}\frac{p_1}{2-p_2} + D_{G2}\frac{1-p_2}{2-p_2} \quad (6)$$

The power $D_{G12}$ corresponds to the power of the main sub-zone of an overall zone 22 with surface area $2*F_Z$, the power of the phase sub-zone of the overall zone with surface area of $2*F_Z$ is $D_{S2}$, however, the proportion of the area of this phase sub-zone to the overall zone 22 with surface area of $2*F_Z$ is now $p_{12}$ with $$p_{12} = \frac{p_2}{2} \quad (7)$$

since now the double area $2*F_Z$ serves as a reference.

By combination of two zones 6 and 10 of each identical surface area FZ (equally sized optical surfaces) of two different lens portions 15 and 16, in addition, overall zones 22 with a surface area $2F_Z$ now arise. These zones 22 have an average main sub-zone power of $D_{G12}$, the phase sub-zone power of these combined zones is $D_{S2}$. This phase sub-zone now has a proportion $p_{12}$ to the overall zone 22. Since the area of this overall zone 22 is two times as large as the area of the two individual zones 6 and 10, the addition of these combined zones 22 according to equation 2 is halved.

The overall zone 22 with the surface area of $2*F_Z$ thus has a main sub-zone power $D_{G12}$, which is an average power according to equation 6. The phase sub-zone power of this zone is $D_{S2}$. If the power $D_{G12}$ was a homogeneous, uniform power, thus, the zone 22 with surface area of $2*F_Z$ would be a zone of a bifocal lens with the addition power $\Delta D_N$ according to equation 4.

By the combination of zones 6 with surface area of $F_Z$ and the powers $D_{G1}$ and $D_{S1}$ with zones 10 with surface area of $F_Z$ and the powers $D_{G2}$ and $D_{S2}$, one obtains a lens with three principal powers, the smallest one of which is a refractive power without longitudinal chromatic aberration.

The combination of similar zones (zones 6 or zones 10) of a lens according to U.S. Pat. No. 6,536,899 results in a bifocal lens. The combination of zones 6 and 10 with respectively different relative far intensities—as explained above—and in particular with a specific far intensity difference of greater than 10% results in a trifocal lens 13.

In particular, zones 6 and zones 10 are combined with each other such that the resulting lens 13 has the same far power and the same near power as the lenses composed exclusively of zones 6 or exclusively of zones 10. If the difference of the relative far intensities of the zones 6 and zones 10 is sufficiently large, then, the resulting lens is trifocal, i.e. it has an additional intermediate power. In order that the smallest of these three principal powers does not have any longitudinal chromatic aberration, the averaged refractive powers of the zones 6 and 10 have to be identical to this smallest power. Analogous facts apply to lenses of the invention, which have more than three principal powers, for example a quadrafocal lens 18 (FIG. 10). In contrast to this, the zones of a trifocal lens according to U.S. Pat. No. 6,536,899 have averaged refractive powers, which are different.

If zones with respectively different relative far intensities and respectively identical averaged refractive powers now are combined in accordance with FIG. 10, then, one obtains an implementation of a quadrafocal lens 18. The lens 18 has a front face 14, wherein in the third lens portion 23 constructed of the annular zones 19, the phase sub-zone 21 has a percentage area proportion p3 to the total area of a zone 19. In FIG. 11, the TFR or axial PSF of such a lens 18 is shown. The relative intensity $I_R$ and the power D are plotted. In this example, the relative far intensities in the three different zones 6, 10, 19 or in the lens portions 15, 16 and 23 are 86% and 75% and 9%, respectively. The results of FIG. 11 apply to 5.75 mm diameter. The solid curve is again for monochromatic light of the wavelength 550 nm, the dashed curve is that for polychromatic light between 450 nm and 650 nm (Gaussian distributed).

Depending on the radial position of a zone 6 of the first lens portion 15, it can be provided that the area proportion p1 varies such that in an internal zone 6 the proportion p1 of a phase sub-zone 7 can be different from a proportion p1 in a further outside zone 6. The same applies to the zones 10 of the lens portion 15 and, if present, for zones 19 of the lens portion 23.

Similarly, the powers and thus the power profiles of the respective zones 6, 10 or 19 can be continuous or discontinuous. They can be constant or depend on the radius.

Generally, it applies that the combination of n>2 dissimilar zones or dissimilar lens portions each with at least one zone with respectively n different relative far intensities $I_1, I_2, \ldots I_n$ and respectively identical averaged refractive powers results in a lens, which has (n+1) principal powers, wherein the smallest of these principal powers does not have any longitudinal chromatic aberration, and which corresponds to the averaged refractive power of all of the n dissimilar zones.

In all of the lenses discussed heretofore with n>2 principal powers and n−1 lens portions, the far powers and the addition powers of the individual lenses or lens zones were identical, only the relative far and near intensities of the zones were different, respectively.

Figure 12:
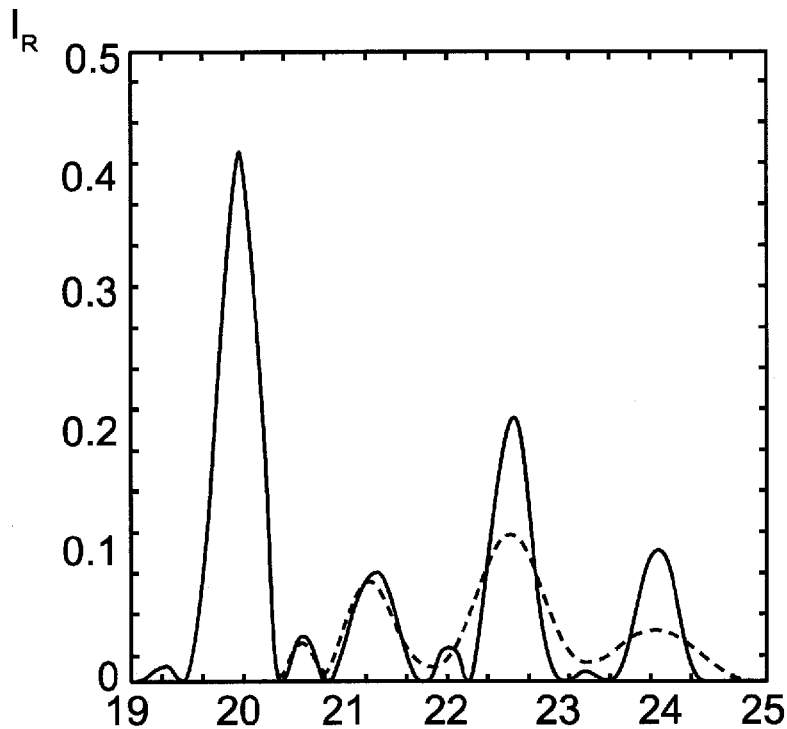
FIG. 12 is a diagram, in which the relative intensities of the principal powers of a lens according to the invention according to the embodiment in FIG. 5 are represented, wherein this lens is constructed of zones of two lens portions, which have respectively different addition powers and respectively different relative far intensities.

Lenses with n>2 principal powers and n−1 lens portions are also encompassed by the invention, which have respectively different relative far intensities, respectively identical averaged refractive powers, but different addition powers. An example is a lens also according to lens 5, which includes odd zones 6 according to FIG. 3, wherein the far power is 20 diopters, the addition power is 4 diopters and the relative far intensity is 40%. The even zones 10 of this lens are zones of a lens according to FIG. 4, which has a far power of 20 diopters, an addition power of 2 diopters and a relative far intensity of 60%. The TFR or axial PSF of this lens is shown in FIG. 12. From the results for polychromatic light between 450 nm and 650 nm (dashed curve), it can be seen that again the smallest of the principal powers does not have any longitudinal chromatic aberration. The solid curve is for monochromatic light of the wavelength 550 nm. The results apply to a lens diameter of 3.6 mm.

The fact is emphasized that in all of the discussed lenses, the smallest of the various powers (far power) is free of longitudinal chromatic aberration. This fact is apparent from FIGS. 8, 11 and 12 and 15, in which the corresponding functions are also shown for polychromatic light.

The relative intensities of the individual powers of the lenses can be varied by corresponding choice of the relative far intensities of the individual zones. If certain relative intensities in the individual powers are desired, then, they can be achieved by systematic variation of the parameters such as individual relative far intensities of the zones and individual addition powers of the zones ("trial and error method").

Figures 13, 14:
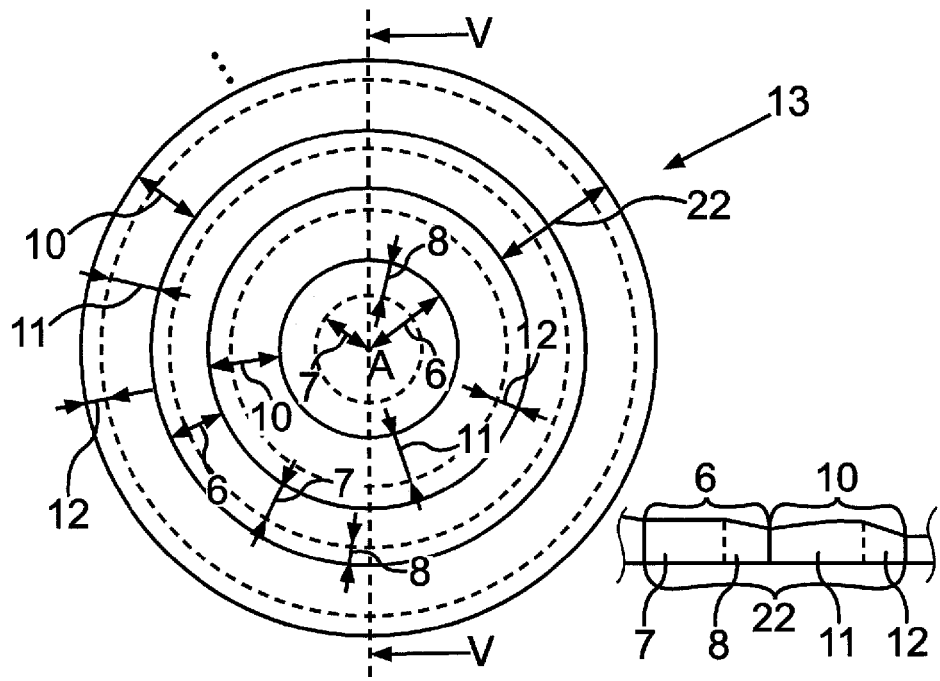
FIG. 13 is a schematic plan view of an embodiment of a lens according to the invention.
FIG. 14 is a schematic partial section of the lens according to FIG. 13 in a longitudinal section representation.

In FIG. 13, a schematic plan view of the lens 13 in particular not to scale with regard to the area sizes of the zones 6 and 10, as it is shown partially in longitudinal section according to the sectional line V-V in FIG. 5, is represented. The first lens portion 15 and thus the sum of the zones 6, some of which are shown in FIG. 13, constitutes a bifocal lens portion 15. Correspondingly, in the implementation according to FIG. 13, the second lens portion 16 is formed with plural zones 10, which also constitute a bifocal lens portion. The lens 13 with its three principal powers is therefore constructed of two bifocal lens portions 15 and 16. They each have plural zones 6 and 10, respectively. They are disposed alternating to each other. The zones 6 of the first lens portion 15 all have an identical area $F_Z$. Similarly, all of the zones 10 of the second lens portion 16 have the same area $F_Z$. This can be seen with regard to the area configuration on the front face 14 of the lens 13. Thus, in the embodiment, two adjacent zones 6 and 10 are formed from the two different bifocal lens portions 15 and 16 with the same areas $F_Z$. The two adjacent zones 6 and 10 of the two different lens portions 15 and 16 constitute an overall zone 22. With respect to the averaged refractive power of such an overall zone 22 with regard to the main sub-zone power thereof as well as with regard to the phase sub-zone power, reference is made to the above mentioned explanations. In FIG. 14, in a further sectional representation, a partial section is shown, in which an overall zone 22 is represented. Such an overall zone 22 can also be formed at other locations of the lens 13 between a zone 6 and a zone 10. The configuration according to FIG. 14 as well as the previously explained equation associations therefore also apply to all further zone pairs with a zone 6 and a zone 10. By the main sub-zone 7 and 11 and the phase sub-zone 8, an overall main sub-zone of the overall zone 22 is formed. The phase sub-zone 12, which locally represents the radial outer sub-zone, is the overall phase sub-zone of the overall zone 22.

Figure 16:
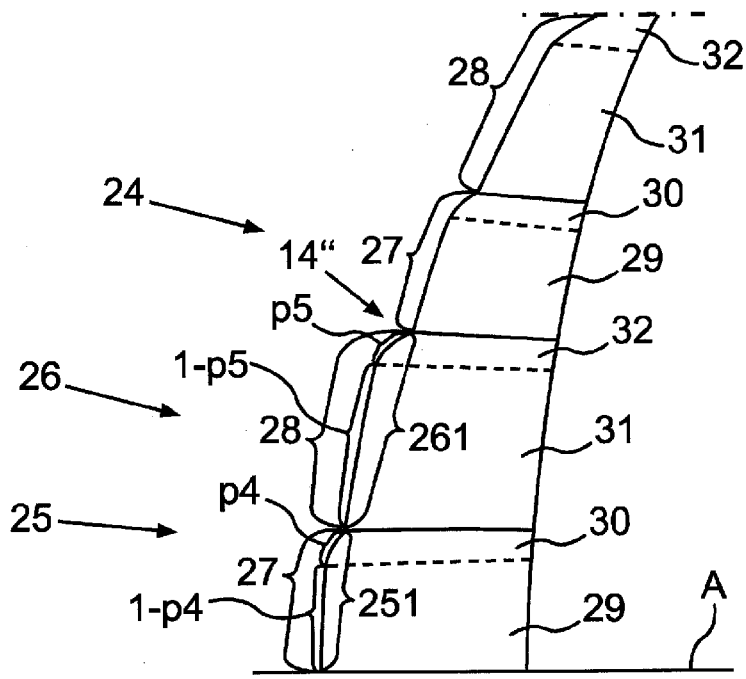
FIG. 16 is a schematic representation of a partial section of a lens according to FIG. 15 in cross-section according to an embodiment of the multifocal lens according to the invention.

In FIG. 16, a further example of a quadrafocal intraocular lens according to the present invention is shown. This lens 24 corresponds to FIGS. 13 and 14 in its construction. Therefore, the lens 24 is only constructed of two bifocal lens portions 25 and 26. The lens portion 25 includes several, in particular two, annular zones 27, which are configured such that the averaged refractive power is 21 diopters and the greater one of the two powers is 24.5 diopters. Thus, the addition power is 3.5 diopters. The lens portion 26 includes several, in particular two, annular zones 28, which are formed such that the average refractive power is also 21 diopters. However, the addition power is 1.75 diopters. In all of the zones 27 and 28, the relative far intensity is 50%. All of the bifocal lens portions 25 and 26 thus have equally high intensities in the two principal powers. The zones 27 and 28 are disposed alternating in radial direction.

Here too, a front face 14" is formed, which represents an optical surface of the lens 24. However, the zones 27 and 28 have respectively only one main sub-zone 29 or 31 and respectively only one phase sub-zone 30 or 32 in the embodiment. The phase sub-zones 30 and 32 are disposed radially outside and adjoining the respective outer zone edge in the respective zone 27 and 28, respectively. A zone 27 has an overall optical surface 251, wherein a zone 28 has an overall optical surface 261. The optical surfaces 251 and 261 are differently sized, wherein the surface 261 is at least 50%, in particular 100% greater than the surface 251. The odd zones 28 counted to the outside in radial direction are therefore substantially larger in area than the even zones 27. The percentage area proportions p4 and p5 of the phase sub-zones 30 and 32 preferably are between 8% and 17%.

Figure 15:
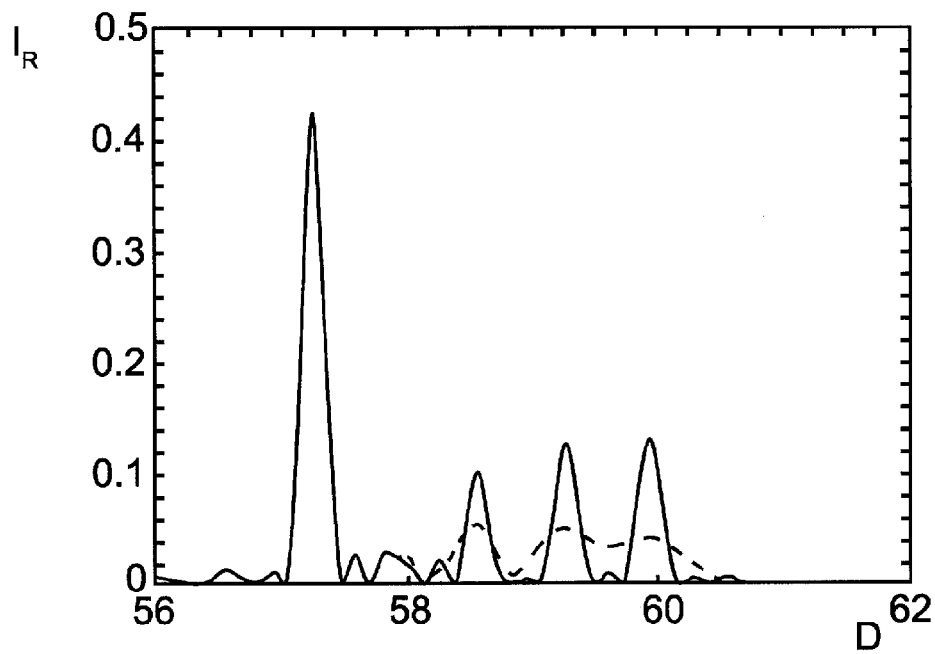
FIG. 15 is a diagram, in which the relative intensities of the principal powers of a lens according to the invention according to the embodiment in FIG. 16 are represented, wherein this quadrafocal lens is constructed of zones of two lens portions, which have respectively different addition powers and respectively identical relative far intensities as well as respectively differently sized optical surfaces.

Now, this lens is virtually positioned behind a single surface cornea with 43 diopters of power with an anterior chamber depth of 4 mm (the anterior chamber depth is the distance between the center of the cornea and the front face of the intraocular lens). The index of the immersion medium surrounding the intraocular lens is 1.336 (standard value). The variable power of the system composed of cornea and intraocular lens is shown in FIG. 15. This power is also referred to as "ocular" power. As it is apparent from FIG. 15, the combination of two lens portions 25 and 26 with respectively identical far power, but with respectively different addition power and in particular different optical surface sizes results in a quadrafocal intraocular lens. The smallest of the four powers corresponds to the smallest power of the lens portions 25 and 26 and is free of longitudinal chromatic aberration, the largest of the four powers corresponds to the greater one of the two powers of the lens portion 25, the second smallest of the four powers corresponds to the greater one of the two powers of the lens portion 26. A further power located between the greatest and the second smallest of the four powers is attributable to interference phenomena between all of the zones of the lens. The example according to FIGS. 15 and 16 thus shows that by combination of only two bifocal lens portions 25 and 26, quadrafocal lenses can also be realized.

In the present description, preferred implementations of lenses in accordance with the present invention have been exemplarily described. Of course, the invention is not restricted to the discussed embodiments. To the man skilled in the art, it is immediately comprehensible that further embodiments exist, which do not depart from the basic idea of the present invention. In the representation of a lens 33 in FIG. 17, the outer third bifocal lens portion adjoining in radial direction to the two first lens portions is not represented. This third lens portion is composed of a plurality of zones, which each have a main sub-zone and a phase sub-zone. Preferably, the zones of this third lens portion have an addition power of 3.75 diopters. The relative far intensities of the zones of this third lens portion are preferably 65%. Preferably, this third lens portion extends in a diameter range between 4.245 mm and 6 mm of the entire lens.

Figure 17:
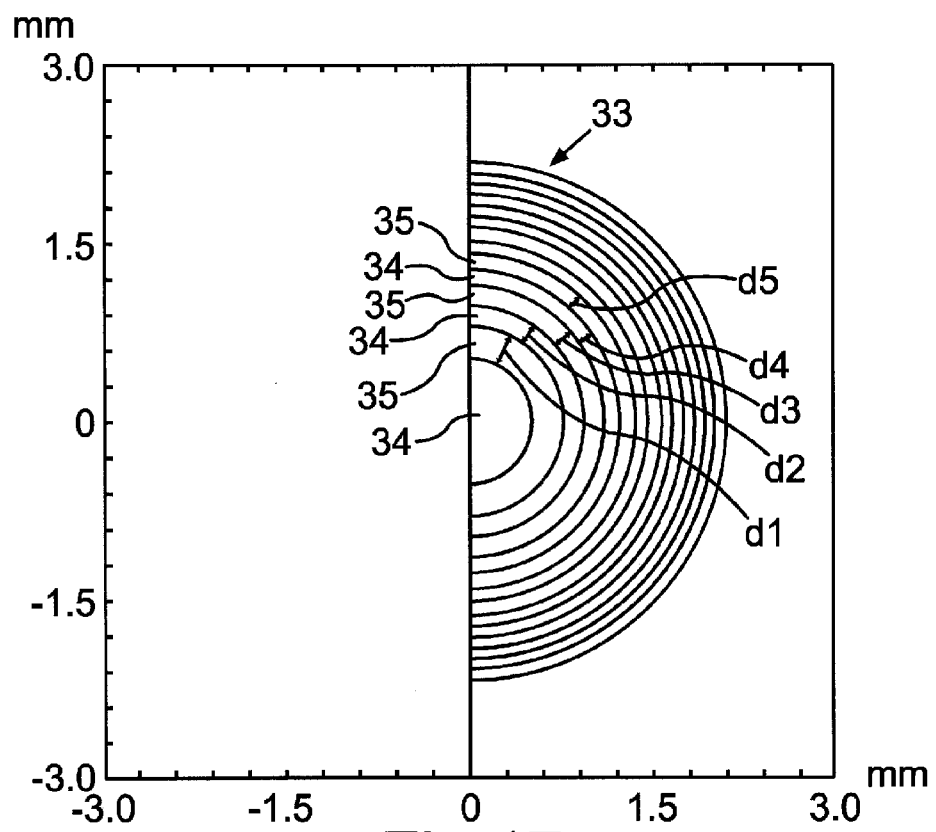
FIG. 17 is a plan view of a partial section of a further embodiment of a lens according to the invention; and, FIG. 18 is a diagram, in which the relative intensities of the principal powers of a lens according to FIG. 17 are represented, wherein this quadrafocal lens is constructed of zones of three lens portions, which have respectively different addition powers and respectively different relative far intensities.

In FIG. 17, zones 34 of the first lens portion and zones 35 of the second lens portion each composed of a main sub-zone and of a phase sub-zone are formed. As is apparent, in radial direction, the zones 34 of the first lens portion are disposed alternating with the zones 35 of the second lens portion. In the shown implementation, the first lens portion is constructed composed of seven zones 34 and the second lens portion is also constructed composed of seven zones 35. The addition power of the first lens portion is 3.75 diopters and the addition power of the second lens portion is 3.1 diopters. The two lens portions extend up to a diameter of 4.245 mm in the lens 33.

The relative far intensity in the zones 34 of the first lens portion is 90% in the embodiment, wherein the relative far intensity in the zones of the second lens portion is 40%. The averaged refractive power of all zones is identical. The area proportion of the optical surface of the main sub-zone is 90% in all zones. This applies to both the first two lens portions and to the third lens portion.

As is moreover appreciable from the representation in FIG. 17, a radial thickness d1 of the first zone 34 of the first lens portion is greater than the radial thickness d2 of the following zone 35 of the second lens portion. Further radial thicknesses d3 to d5 are shown, which correspond to the further zones 35, 34 and 35, respectively. The radial thicknesses d1 to d5 and so on are configured in such a way that all zones 34 have the same surface size and all zones 35 have the same surface size, which is different from the surface size of the zones 34.

In a further preferred general embodiment all annular zones 34 have the same surface size. Further all annular zones 35 have the same surface size, which is different to the surface size of the annular zones 34. Therefore the radial thicknesses d1 to d5 and so on are different and decrease with the radius of the lens.

Figure 18:
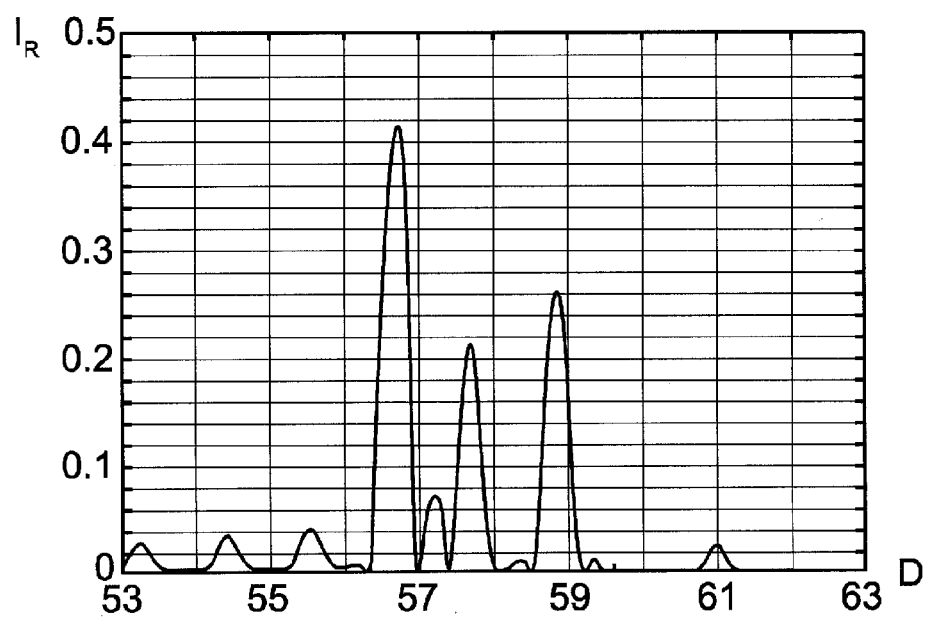

Based on the representation in FIG. 17, in the diagram according to FIG. 18, the intensity distribution of the relative intensity $I_R$ is shown for the four principal powers of the lens according to FIG. 17. The four substantial apexes or peaks with their relative intensity distributions are illustrated.

Based on the representation in FIG. 17, a quadrafocal lens can also be provided, which does not have the outer third lens portion and thus is only constructed composed of the two first lens portions. Then, further lens portions are not provided.

Based on the representation in FIG. 17 and the explanation of the quadrafocal lens composed of three lens portions, which are each bifocal, a corresponding lens can be provided, in which the values for the addition powers are again 3.75, 3.1 and 3.33 or 3.75 for the first three lens portions. In contrast to the above explanation, here, it can then be provided that the relative far intensities are 85% for the zones 34 of the first lens portion, 39.5% for the zones 35 of the second lens portion and 65% for the zone of the third lens portion. Here too, alternatively, a quadrafocal lens could be provided, which is only composed of the two first lens portions.

Again in contrast thereto, two further implementations for a quadrafocal lens can be provided, which are only different in the relative far intensities; they are 82% for the first lens portion, 41.75% for the second lens portion and 65% for the third lens portion. Here too, a quadrafocal lens can then be provided, which is constructed only composed of the first two lens portions.

A further alternative quadrafocal lens can be provided, which again only differs in the far intensities with respect to the previously mentioned example. Here, it can then be provided that the relative far intensity of the first lens portion is 86.5% and that of the second lens portion is 40%. If a third lens portion is present, the relative far intensity thereof is in particular again 65%.

In all of the implementations, the innermost first zone of the first lens portion is also referred to as annular.

It is understood that the foregoing description is that of the preferred embodiments of the invention and that various changes and modifications may be made thereto without departing from the spirit and scope of the invention as defined in the appended claims.

What is claimed is:

1. A multifocal lens having a number n>2 of principal powers and comprising:
   a maximum of n−1 lens portions including a first lens portion having at least one first annular zone and a second lens portion having at least one second annular zone;
   said annular zones having respective main sub-zones exhibiting refractive powers and respective phase sub-zones exhibiting refractive powers and providing phase shifts;
   a combination of said main sub-zones forming a diffractive lens portion providing at least one diffractive power, said diffractive power being one of the principle powers of said multifocal lens;
   said lens portions differing in at least one optical parameter from each other and being combined to form said n principal powers; and,
   an averaged refractive power of said first annular zone of the first lens portion being equal to an averaged refractive power of said second annular zone of the second lens portion.

2. The multifocal lens of claim 1, wherein the averaged refractive power of said annular zones is equal to the smallest one of said principal powers of said multifocal lens.

3. The multifocal lens of claim 1, wherein the smallest one of said n principal powers is free of diffractive longitudinal chromatic aberration.

4. The multifocal lens of claim 3, wherein said multifocal lens is formed in the shape and/or relative position of said annular zones to each other such that the smallest one of said principal powers is free of longitudinal chromatic aberration independently of the number of the principal powers n>2.

5. The multifocal lens of claim 1, wherein said first lens portion has at least two of said annular zones, between which, viewed in radial direction of said multifocal lens, said at least one annular zone of said second lens portion is disposed.

6. The multifocal lens of claim 5, wherein, viewed in radial direction, said annular zones of said lens portions are disposed in alternating order.

7. The multifocal lens of claim 1, wherein an overall zone formed of two adjacent annular zones of said two lens portions has an averaged refractive power $D_{G12}$ of an overall main sub-zone which is determined according to the following formula:

$$D_{G12} = D_{G1}\frac{1-p_1}{2-p_2} + D_{S1}\frac{p_1}{2-p_2} + D_{G2}\frac{1-p_2}{2-p_2},$$

wherein $D_{G1}$ is the refractive power in the main sub-zone of the first zone,
wherein $D_{G2}$ is the refractive power in the main sub-zone of the second zone, wherein $D_{S1}$ is the refractive power in the phase sub-zone of the first zone, wherein $p_1$ is the area proportion of the first phase sub-zone to the total first zone, and wherein $p_2$ is the area proportion of the second phase sub-zone to the total second zone.

8. The multifocal lens of claim 1, wherein the annular zone of said first lens portion is formed adjoining the annular zone of the second lens portion and the optical surfaces of the annular zones are of equal size.

9. A multifocal lens having a number n>2 of principal powers and comprising:
- a maximum of n−1 lens portions including a first lens portion having at least one first annular zone and a second lens portion having at least one second annular zone;
- said annular zones having respective main sub-zones exhibiting refractive powers and respective phase sub-zones exhibiting refractive powers and providing phase shifts;
- a combination of said main sub-zones forming a diffractive lens portion providing at least one diffractive power, said diffractive power being one of the principle powers of said multifocal lens;
- said lens portions differing in at least one optical parameter from each other and being combined to form said n principal powers; and,
- an averaged refractive power of said first annular zone of the first lens portion being equal to an averaged refractive power of said second annular zone of the second lens portion,
- wherein a relative far intensity of the at least one annular zone of said first lens portion is greater than 10% different from a relative far intensity of the at least one annular zone of said second lens portion.

10. A multifocal lens having a number n>2 of principal powers and comprising:
- a maximum of n−1 lens portions including a first lens portion having at least one first annular zone and a second lens portion having at least one second annular zone;
- said annular zones having respective main sub-zones exhibiting refractive powers and respective phase sub-zones exhibiting refractive powers and providing phase shifts;
- a combination of said main sub-zones forming a diffractive lens portion providing at least one diffractive power, said diffractive power being one of the principle powers of said multifocal lens;
- said lens portions differing in at least one optical parameter from each other and being combined to form said n principal powers; and,
- an averaged refractive power of said first annular zone of the first lens portion being equal to an averaged refractive power of said second annular zone of the second lens portion,
- wherein a relative far intensity of the at least one annular zone of said first lens portion is greater than 30% different from a relative far intensity of the at least one annular zone of said second lens portion.

11. A multifocal lens having a number n>2 of principal powers and comprising:
- a maximum of n−1 lens portions including a first lens portion having at least one first annular zone and a second lens portion having at least one second annular zone;
- said annular zones having respective main sub-zones exhibiting refractive powers and respective phase sub-zones exhibiting refractive powers and providing phase shifts;
- a combination of said main sub-zones forming a diffractive lens portion providing at least one diffractive power, said diffractive power being one of the principle powers of said multifocal lens;
- said lens portions differing in at least one optical parameter from each other and being combined to form said n principal powers; and,
- an averaged refractive power of said first annular zone of the first lens portion being equal to an averaged refractive power of said second annular zone of the second lens portion,
- wherein a relative far intensity of the at least one annular zone of said first lens portion is greater than 100% different from a relative far intensity of the at least one annular zone of said second lens portion.

12. A multifocal lens having a number n>2 of principal powers and comprising:
- a maximum of n−1 lens portions including a first lens portion having at least one first annular zone and a second lens portion having at least one second annular zone;
- said annular zones having respective main sub-zones exhibiting refractive powers and respective phase sub-zones exhibiting refractive powers and providing phase shifts;
- a combination of said main sub-zones forming a diffractive lens portion providing at least one diffractive power, said diffractive power being one of the principle powers of said multifocal lens;
- said lens portions differing in at least one optical parameter from each other and being combined to form said n principal powers; and,
- an averaged refractive power of said first annular zone of the first lens portion being equal to an averaged refractive power of said second annular zone of the second lens portion,
- wherein said multifocal lens is a trifocal lens with said first and second lens portions being configured as two bifocal lens portions.

13. A multifocal lens having a number n>2 of principal powers and comprising:
- a maximum of n−1 lens portions including a first lens portion having at least one first annular zone and a second lens portion having at least one second annular zone;
- said annular zones having respective main sub-zones exhibiting refractive powers and respective phase sub-zones exhibiting refractive powers and providing phase shifts;
- a combination of said main sub-zones forming a diffractive lens portion providing at least one diffractive power, said diffractive power being one of the principle powers of said multifocal lens;
- said lens portions differing in at least one optical parameter from each other and being combined to form said n principal powers; and,
- an averaged refractive power of said first annular zone of the first lens portion being equal to an averaged refractive power of said second annular zone of the second lens portion,
- wherein said multifocal lens is a quadrafocal lens which includes a third lens portion and said lens portions are configured as three bifocal lens portions.

14. A multifocal lens having a number n>2 of principal powers and comprising:
- a maximum of n−1 lens portions including a first lens portion having at least one first annular zone and a second lens portion having at least one second annular zone;

said annular zones having respective main sub-zones exhibiting refractive powers and respective phase sub-zones exhibiting refractive powers and providing phase shifts;

a combination of said main sub-zones forming a diffractive lens portion providing at least one diffractive power, said diffractive power being one of the principle powers of said multifocal lens;

said lens portions differing in at least one optical parameter from each other and being combined to form said n principal powers; and, an averaged refractive power of said first annular zone of the first lens portion being equal to an averaged refractive power of said second annular zone of the second lens portion, wherein said multifocal lens is a quadrafocal lens with said first and second lens portions being configured as first and second bifocal lens portions; said first annular zone of said first lens portion has an optical surface and said second annular zone of said second lens portion has an optical surface; and, said optical surface of said first annular zone is of a different size than said optical surface of said second annular zone.

15. The multifocal lens of claim 14, wherein said optical surface of said second lens portion is greater than the optical surface of the first lens portion by at least 50%.

16. The multifocal lens of claim 14, wherein said optical surface of said second lens portion is greater than the optical surface of the first lens portion by at least 90%.

17. The multifocal lens of claim 1, wherein the addition powers of said two lens portions are different and said lens portions have the same relative far intensities.

18. The multifocal lens of claim 1, wherein the addition powers of said two lens portions are different.

19. The multifocal lens of claim 1, wherein said two lens portions have the same relative far intensities.

20. The multifocal lens of claim 1, wherein said multifocal lens has a surface structured with said annular zones formed so as to cause an astigmatic effect with respect to the imaging characteristic of said multifocal lens.

21. The multifocal lens of claim 20, wherein the power of at least one of said annular zones is dependent upon a meridian angle.

22. The multifocal lens of claim 1, wherein in at least one meridian of said multifocal lens, an averaged refractive power of the annular zone of said first lens portion is equal to an averaged refractive power of the annular zone of said second lens portion.

23. The multifocal lens of claim 1, wherein in each meridian of said multifocal lens, an averaged refractive power of the annular zone of said first lens portion is equal to an averaged refractive power of the annular zone of said second lens portion.

* * * * *

UNITED STATES PATENT AND TRADEMARK OFFICE
CERTIFICATE OF CORRECTION

PATENT NO. : 9,223,148 B2  
APPLICATION NO. : 13/662515  
DATED : December 29, 2015  
INVENTOR(S) : Werner Fiala and Mario Gerlach Page 1 of 1

It is certified that error appears in the above-identified patent and that said Letters Patent is hereby corrected as shown below:

Specification

In Column 13:  
Line 24: delete "to th".

In Column 17:  
Line 31: delete "$D_1=D_{G1} (1-p_1) +D_{S1}p_1=D_{S1}p_1=D_{G2} (1-p_2) +D_{S2}p_2$" and substitute -- $D_1=D_{G1} (1-p_1) +D_{S1}p_1=D_{G2} (1-p_2) +D_{S2}p_2$ -- therefor.

Signed and Sealed this  
Thirty-first Day of May, 2016

Michelle K. Lee  
*Director of the United States Patent and Trademark Office*